(12) United States Patent
Gjertson et al.

(10) Patent No.: US 10,878,394 B1
(45) Date of Patent: Dec. 29, 2020

(54) INTELLIGENT INVENTORY RECOMMENDATIONS

(71) Applicant: Square, Inc., San Francisco, CA (US)

(72) Inventors: Niels Gjertson, San Francisco, CA (US); Matthew Capers, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/204,583

(22) Filed: Nov. 29, 2018

(51) Int. Cl.
*G06Q 30/02* (2012.01)
*G06Q 20/20* (2012.01)
*G06Q 10/08* (2012.01)
*G06Q 30/06* (2012.01)
G06F 3/0481 (2013.01)

(52) U.S. Cl.
CPC ......... *G06Q 20/203* (2013.01); *G06Q 10/087* (2013.01); *G06Q 20/202* (2013.01); *G06Q 30/0223* (2013.01); *G06Q 30/0238* (2013.01); *G06Q 30/0631* (2013.01); *G06F 3/04817* (2013.01)

(58) Field of Classification Search
CPC .................................................. G06Q 30/02
See application file for complete search history.

(56) References Cited

U.S. PATENT DOCUMENTS

| 5,057,829 | A | 10/1991 | Velazquez |
| 5,168,445 | A | 12/1992 | Kawashima et al. |
| 5,765,143 | A | 6/1998 | Sheldon et al. |
| 5,933,813 | A | 8/1999 | Teicher et al. |
| 6,151,582 | A | 11/2000 | Huang et al. |
| 6,431,444 | B1 | 8/2002 | Gatto |
| 6,595,342 | B1 | 7/2003 | Maritzen et al. |
| 6,609,101 | B1 | 8/2003 | Landvater |
| 6,687,679 | B1 | 2/2004 | Van Luchene et al. |
| 7,013,290 | B2 | 3/2006 | Ananian |

(Continued)

FOREIGN PATENT DOCUMENTS

CA 2 332 083 A1 7/2001

OTHER PUBLICATIONS

Non-Final Office Action dated Jun. 3, 2019, for U.S. Appl. No. 14/700,044, of Brock, Z., et al., filed Apr. 29, 2015.

(Continued)

*Primary Examiner* — Vincent M Cao
(74) *Attorney, Agent, or Firm* — Lee & Hayes, P.C.

(57) ABSTRACT

Techniques for recommending actions for a merchant to perform to encourage a sale of an item based on an expiration associated therewith. A service provider may determine expiration data associated with inventory items offered for sale by the merchant. The expiration data may be based on a recommended date and/or time provided by the manufacturer, a merchant preference and/or a service provider setting. In some examples, the expiration data associated with an item may be determined based on expiration data associated with one or more similar items. The service provider may monitor the expiration data associated with each item of inventory and may determine that an expiration associated with a particular item is within a threshold period of time. Based on the expiration being within the threshold period of time, the service provider may send a recommendation to the merchant to perform an action to encourage the sale of the particular item.

20 Claims, 10 Drawing Sheets

(56) References Cited

U.S. PATENT DOCUMENTS

| | | |
|---|---|---|
| 7,092,929 B1 | 8/2006 | Dvorak et al. |
| 7,222,786 B2 | 5/2007 | Renz et al. |
| 7,343,319 B1 | 3/2008 | Walker et al. |
| 7,552,066 B1 | 6/2009 | Landvater |
| 7,660,738 B1 | 2/2010 | Siegel et al. |
| 7,720,708 B1* | 5/2010 | Elkins, II ........... G06Q 30/0207 |
| | | 705/14.1 |
| 7,792,256 B1 | 9/2010 | Arledge et al. |
| 7,818,284 B1 | 10/2010 | Walker et al. |
| 7,882,209 B1 | 2/2011 | Eslambolchi et al. |
| 7,941,331 B2 | 5/2011 | Dogan et al. |
| 7,979,299 B1 | 7/2011 | Mehta et al. |
| 8,001,017 B1 | 8/2011 | Franco |
| 8,103,538 B2 | 1/2012 | Bamberg et al. |
| 8,204,799 B1 | 6/2012 | Murray et al. |
| 8,239,296 B2 | 8/2012 | Itoi et al. |
| 8,355,954 B1* | 1/2013 | Goldberg ............... G06Q 30/02 |
| | | 705/26.1 |
| 8,417,572 B1 | 4/2013 | Chenault |
| 8,438,066 B1 | 5/2013 | Yuen et al. |
| 8,533,053 B2 | 9/2013 | Brown et al. |
| 8,650,062 B2 | 2/2014 | Krech |
| 8,732,040 B1 | 5/2014 | Prabhune et al. |
| 9,168,315 B1 | 10/2015 | Scaringe et al. |
| 9,323,441 B1* | 4/2016 | Minks-Brown ....... G06F 3/0485 |
| 9,619,483 B1 | 4/2017 | Robinson et al. |
| 9,619,831 B1 | 4/2017 | Kumar et al. |
| 9,659,310 B1 | 5/2017 | Allen et al. |
| 9,786,005 B1 | 10/2017 | Poursartip et al. |
| 9,792,597 B1 | 10/2017 | Jen et al. |
| 10,318,569 B1 | 6/2019 | Funk et al. |
| 10,339,548 B1 | 7/2019 | Kumar et al. |
| 10,373,118 B1 | 8/2019 | Lefkow et al. |
| 10,467,583 B1 | 11/2019 | Jen et al. |
| 2001/0034722 A1 | 10/2001 | Tidball et al. |
| 2001/0042008 A1 | 11/2001 | Hull et al. |
| 2002/0010661 A1 | 1/2002 | Waddington et al. |
| 2002/0065839 A1 | 5/2002 | McCulloch |
| 2002/0072988 A1 | 6/2002 | Aram |
| 2002/0091595 A1 | 7/2002 | Itoi et al. |
| 2002/0133368 A1 | 9/2002 | Strutt et al. |
| 2002/0147656 A1 | 10/2002 | Tam et al. |
| 2002/0188579 A1 | 12/2002 | Liu et al. |
| 2003/0006098 A1 | 1/2003 | Wike, Jr. et al. |
| 2003/0018701 A1 | 1/2003 | Kaestle et al. |
| 2003/0026404 A1 | 2/2003 | Joyce et al. |
| 2003/0033179 A1 | 2/2003 | Katz et al. |
| 2003/0046133 A1 | 3/2003 | Morley et al. |
| 2003/0151821 A1 | 8/2003 | Favalora et al. |
| 2003/0216969 A1* | 11/2003 | Bauer ................... G06K 7/0008 |
| | | 705/22 |
| 2004/0019552 A1 | 1/2004 | Tobin |
| 2004/0039639 A1 | 2/2004 | Walker et al. |
| 2004/0098311 A1 | 5/2004 | Nair et al. |
| 2004/0153359 A1 | 8/2004 | Ho et al. |
| 2004/0181753 A1 | 9/2004 | Michaelides |
| 2004/0186783 A1* | 9/2004 | Knight ................. G06Q 10/087 |
| | | 705/16 |
| 2004/0267640 A1 | 12/2004 | Bong et al. |
| 2005/0149414 A1 | 7/2005 | Schrodt et al. |
| 2005/0250555 A1 | 11/2005 | Richardson et al. |
| 2005/0273377 A1 | 12/2005 | Ouimet et al. |
| 2006/0031085 A1 | 2/2006 | Postel et al. |
| 2006/0106699 A1 | 5/2006 | Hitalenko et al. |
| 2006/0195563 A1 | 8/2006 | Chapin et al. |
| 2006/0224470 A1 | 10/2006 | Garcia Ruano et al. |
| 2006/0235726 A1 | 10/2006 | Paraison et al. |
| 2006/0235739 A1 | 10/2006 | Levis et al. |
| 2006/0253330 A1 | 11/2006 | Maggio et al. |
| 2007/0124221 A1 | 5/2007 | Itoi et al. |
| 2007/0244765 A1 | 10/2007 | Hunter et al. |
| 2008/0077459 A1 | 3/2008 | Desai et al. |
| 2008/0082427 A1 | 4/2008 | Gandhi et al. |
| 2008/0103846 A1 | 5/2008 | Armstrong et al. |
| 2008/0120206 A1 | 5/2008 | Weiler et al. |
| 2008/0147507 A1 | 6/2008 | Langhammer |
| 2008/0191881 A1 | 8/2008 | Minerley |
| 2008/0198761 A1 | 8/2008 | Murawski et al. |
| 2008/0201232 A1 | 8/2008 | Walker et al. |
| 2008/0216001 A1 | 9/2008 | Ording et al. |
| 2008/0228582 A1 | 9/2008 | Fordyce et al. |
| 2008/0281792 A1 | 11/2008 | Pickett et al. |
| 2008/0301095 A1 | 12/2008 | Zhu et al. |
| 2009/0089148 A1 | 4/2009 | Gujjar et al. |
| 2009/0222337 A1 | 9/2009 | Sergiades |
| 2009/0299794 A1 | 12/2009 | Marchi et al. |
| 2010/0138037 A1 | 6/2010 | Adelberg et al. |
| 2010/0169130 A1 | 7/2010 | Fineman et al. |
| 2010/0174596 A1 | 7/2010 | Gilman et al. |
| 2010/0234986 A1 | 9/2010 | Clopton et al. |
| 2011/0010448 A1 | 1/2011 | Gill et al. |
| 2011/0011931 A1 | 1/2011 | Farley et al. |
| 2011/0034722 A1 | 2/2011 | Muroi et al. |
| 2011/0042008 A1 | 2/2011 | Hori et al. |
| 2011/0047022 A1 | 2/2011 | Walker et al. |
| 2011/0054649 A1 | 3/2011 | Sarkis et al. |
| 2011/0054992 A1* | 3/2011 | Liberty .................. G06Q 30/02 |
| | | 705/14.24 |
| 2011/0066504 A1 | 3/2011 | Chatow et al. |
| 2011/0082734 A1 | 4/2011 | Zhang et al. |
| 2011/0191861 A1 | 8/2011 | Spears |
| 2011/0213644 A1 | 9/2011 | Phene |
| 2011/0225023 A1 | 9/2011 | Evens et al. |
| 2011/0238577 A1 | 9/2011 | Shuster |
| 2011/0258083 A1 | 10/2011 | Ren |
| 2011/0258117 A1 | 10/2011 | Ahmad et al. |
| 2011/0313840 A1 | 12/2011 | Mason et al. |
| 2012/0016758 A1 | 1/2012 | Bouaziz et al. |
| 2012/0041675 A1 | 2/2012 | Juliver et al. |
| 2012/0054076 A1 | 3/2012 | Wu et al. |
| 2012/0084119 A1 | 4/2012 | Vandehey et al. |
| 2012/0095882 A1 | 4/2012 | Wolff |
| 2012/0116810 A1 | 5/2012 | Knowlton et al. |
| 2012/0209661 A1 | 8/2012 | Bennett et al. |
| 2012/0311723 A1 | 12/2012 | Britt, Jr. et al. |
| 2013/0006742 A1 | 1/2013 | Richard |
| 2013/0046634 A1 | 2/2013 | Grigg et al. |
| 2013/0066698 A1 | 3/2013 | Levy et al. |
| 2013/0066733 A1 | 3/2013 | Levy et al. |
| 2013/0124360 A1 | 5/2013 | Mitrovic |
| 2013/0126610 A1 | 5/2013 | Aihara et al. |
| 2013/0132140 A1 | 5/2013 | Amin et al. |
| 2013/0132180 A1 | 5/2013 | Aihara et al. |
| 2013/0132193 A1 | 5/2013 | Aihara et al. |
| 2013/0132218 A1 | 5/2013 | Aihara et al. |
| 2013/0132246 A1 | 5/2013 | Amin et al. |
| 2013/0132887 A1 | 5/2013 | Amin et al. |
| 2013/0166332 A1 | 6/2013 | Hammad |
| 2013/0169413 A1 | 7/2013 | Schuessler |
| 2013/0173435 A1 | 7/2013 | Cozad, Jr. |
| 2013/0246176 A1 | 9/2013 | Chang et al. |
| 2013/0246207 A1 | 9/2013 | Novak et al. |
| 2013/0246301 A1 | 9/2013 | Radhakrishnan et al. |
| 2013/0282392 A1 | 10/2013 | Wurm |
| 2013/0311211 A1 | 11/2013 | Zafar et al. |
| 2013/0325672 A1 | 12/2013 | Odenheimer et al. |
| 2014/0012704 A1 | 1/2014 | Mizhen et al. |
| 2014/0025524 A1 | 1/2014 | Sims et al. |
| 2014/0046748 A1 | 2/2014 | Nagarajan et al. |
| 2014/0067596 A1 | 3/2014 | McGovern et al. |
| 2014/0067677 A1 | 3/2014 | Ali et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0149201 A1 | 5/2014 | Abbott et al. |
| 2014/0164126 A1 | 6/2014 | Nichols et al. |
| 2014/0173020 A1 | 6/2014 | Reilly et al. |
| 2014/0180959 A1 | 6/2014 | Gillen et al. |
| 2014/0222711 A1 | 8/2014 | Tibbs et al. |
| 2014/0244416 A1 | 8/2014 | Venkat et al. |
| 2014/0249941 A1 | 9/2014 | Hicks et al. |
| 2014/0279035 A1 | 9/2014 | Fleming et al. |
| 2014/0279204 A1 | 9/2014 | Roketenetz et al. |
| 2014/0279241 A1 | 9/2014 | Bartholomew et al. |

(56) References Cited

U.S. PATENT DOCUMENTS

| | | | |
|---|---|---|---|
| 2014/0297470 | A1 | 10/2014 | Ramadge et al. |
| 2014/0330685 | A1 | 11/2014 | Nazzari |
| 2014/0344118 | A1 | 11/2014 | Parpia et al. |
| 2015/0066671 | A1 | 3/2015 | Nichols et al. |
| 2015/0095091 | A1 | 4/2015 | Kamdar |
| 2015/0100433 | A1 | 4/2015 | Choy et al. |
| 2015/0134552 | A1 | 5/2015 | Engels et al. |
| 2015/0161564 | A1 | 6/2015 | Sweeney et al. |
| 2015/0161714 | A1 | 6/2015 | Fainshtein |
| 2015/0178654 | A1 | 6/2015 | Glasgow et al. |
| 2015/0269521 | A1 | 9/2015 | Knapp et al. |
| 2015/0278912 | A1 | 10/2015 | Melcher et al. |
| 2015/0302510 | A1 | 10/2015 | Godsey et al. |
| 2015/0310383 | A1* | 10/2015 | Iser .................. G06Q 10/087 705/26.81 |
| 2015/0310397 | A1 | 10/2015 | Xu |
| 2015/0332414 | A1 | 11/2015 | Unser |
| 2016/0086222 | A1 | 3/2016 | Kurapati |
| 2016/0092827 | A1 | 3/2016 | Colodny et al. |
| 2016/0275424 | A1 | 9/2016 | Concannon et al. |
| 2016/0321677 | A1 | 11/2016 | Dobaj |
| 2017/0011423 | A1 | 1/2017 | Douglas et al. |
| 2017/0032382 | A1 | 2/2017 | Shulman et al. |
| 2017/0236152 | A1 | 8/2017 | Dimaunahan et al. |
| 2017/0345105 | A1 | 11/2017 | Isaacson et al. |
| 2018/0025442 | A1 | 1/2018 | Isaacson et al. |
| 2018/0150387 | A1 | 5/2018 | Kogan et al. |
| 2018/0204256 | A1 | 7/2018 | Bifolco et al. |
| 2018/0232817 | A1 | 8/2018 | Isaacson et al. |
| 2018/0315111 | A1 | 11/2018 | Alvo et al. |
| 2018/0365753 | A1 | 12/2018 | Fredrich et al. |
| 2019/0272497 | A1 | 9/2019 | Tingler et al. |
| 2019/0287125 | A1 | 9/2019 | Kumar et al. |
| 2019/0295148 | A1 | 9/2019 | Lefkow et al. |
| 2019/0310126 | A1 | 10/2019 | Gurumohan et al. |

OTHER PUBLICATIONS

Non-Final Office Action dated Jul. 30, 2019, for U.S. Appl. No. 14/964,263, of Jen, M., et al., filed Dec. 9, 2015.
Non-Final Office Action dated Aug. 28, 2018, for U.S. Appl. No. 14/522,208, of Cieri, M.M., et al., filed Oct. 23, 2014.
Non-Final Office Action dated Sep. 6, 2018, for U.S. Appl. No. 15/858,911, of Funk, M., et al., filed Dec. 29, 2017.
Non-Final Office Action dated Sep. 14, 2018, for U.S. Appl. No. 14/964,263, of Jen, M., et al., filed Dec. 9, 2015.
Final Office Action dated Sep. 24, 2018, for U.S. Appl. No. 14/700,044, of Brock, Z., et al., filed Apr. 29, 2015.
Advisory Action dated Oct. 30, 2018, for U.S. Appl. No. 14/800,090, of Tsou, V., filed Jul. 15, 2015.
Final Office Action dated Nov. 14, 2018, for U.S. Appl. No. 14/289,467, of Kumar, A., et al., filed May 28, 2014.
Advisory Action dated Dec. 5, 2018, for U.S. Appl. No. 14/700,044, of Brick Z., et al., filed Dec. 9, 2015.
Final Office Action dated Jan. 17, 2019, for U.S. Appl. No. 14/964,263, of Mark, J., et al. filed Dec. 9, 2015.
Final Office Action dated Jan. 25, 2019, for U.S. Appl. No. 14/522,208, of Cieri, M.M., et al., filed Oct. 23, 2014.
Notice of Allowance dated Jan. 29, 2019, for U.S. Appl. No. 15/858,911, of Funk, M., et al., filed Dec. 29, 2017.
Final Office Action dated Feb. 4, 2019, for U.S. Appl. No. 14/800,021, of Tsou, V., filed Jul. 15, 2015.
Final Office Action dated Feb. 6, 2019, for U.S. Appl. No. 14/964,231, of Jen, M., et al. filed Dec. 9, 2015.
Notice of Allowance dated Feb. 7, 2019, for U.S. Appl. No. 14/289,467, of Kumar, A., et al. , filed May 28, 2014.
Advisory Action dated Apr. 1, 2019, for U.S. Appl. No. 14/964,263, of Mark, J., et al. filed Dec. 9, 2015.
Advisory Action dated Apr. 22, 2019, for U.S. Appl. No. 14/522,208, of Cieri, M.M., et al., filed Oct. 23, 2014.
Advisory Action dated Apr. 24, 2019, for U.S. Appl. No. 14/800,021, of Tsou, V., filed Jul. 15, 2015.
Advisory Action dated Apr. 30, 2019, for U.S. Appl. No. 14/964,231, of Jen, M., et al., filed Dec. 9, 2015.
Non Final office Action dated May 31, 2019, for U.S. Appl. No. 14/800,021, of Tsou, V., filed Jul. 15, 2015.
Non Final Office Action dated Jun. 14, 2019, for U.S. Appl. No. 14/522,208, of Cieri, M.M., et al., filed Oct. 23, 2014.
Notice of Allowance dated Jun. 20, 2019, for U.S. Appl. No. 14/964,231, of Jen, M., et al., filed Dec. 9, 2015.
Bidgoli, H., "The Internet Encyclopedia", John Wiley and Sons, vol. 1, pp. 2735 (2004), Part 1.
Bidgoli, H., "The Internet Encyclopedia", John Wiley and Sons, vol. 1, pp. 2735 (2004), Part 2.
Bidgoli, H., "The Internet Encyclopedia", John Wiley and Sons, vol. 1, pp. 2735 (2004), Part 3.
Bidgoli, H., "The Internet Encyclopedia", John Wiley and Sons, vol. 1, pp. 2735 (2004), Part 4.
Bidgoli, H., "The Internet Encyclopedia", John Wiley and Sons, vol. 1, pp. 2735 (2004), Part 5.
Bidgoli, H., "The Internet Encyclopedia", John Wiley and Sons, vol. 1, pp. 2735 (2004), Part 6.
Bidgoli, H., "The Internet Encyclopedia", John Wiley and Sons, vol. 1, pp. 2735 (2004), Part 7.
Bidgoli, H., "The Internet Encyclopedia", John Wiley and Sons, vol. 1, pp. 2735 (2004), Part 8.
Bidgoli, H., "The Internet Encyclopedia", John Wiley and Sons, vol. 1, pp. 2735 (2004), Part 9.
Bidgoli, H., "The Internet Encyclopedia", John Wiley and Sons, vol. 1, pp. 2735 (2004), Part 10.
Bidgoli, H., "The Internet Encyclopedia", John Wiley and Sons, vol. 1, pp. 2735 (2004), Part 11.
Bidgoli, H., "The Internet Encyclopedia", John Wiley and Sons, vol. 1, pp. 2735 (2004), Part 12.
Bidgoli, H., "The Internet Encyclopedia", John Wiley and Sons, vol. 1, pp. 2735 (2004), Part 13.
Bidgoli, H., "The Internet Encyclopedia", John Wiley and Sons, vol. 1, pp. 2735 (2004), Part 14.
Bidgoli, H., "The Internet Encyclopedia", John Wiley and Sons, vol. 1, pp. 2735 (2004), Part 15.
Bidgoli, H., "The Internet Encyclopedia", John Wiley and Sons, vol. 1, pp. 2735 (2004), Part 16.
Bidgoli, H., "The Internet Encyclopedia", John Wiley and Sons, vol. 1, pp. 2735 (2004), Part 17.
Chen, F., and Samroengraja, R., "A Staggered Ordering Policy for One-Warehouse, Multiretailer Systems," Operations Research, vol. 48, Issue 2, pp. 281-293 (Apr. 1, 2000.
Cox, J.F., III, and Walker, E.D., II, "The Poker Chip Game: A Multi-product, Multi-customer, Multi-echelon, Stochastic Supply Chain Network Useful for Teaching the Impacts of Pull versus Push Inventory Policies on Link and Chain Performance," Informs Transactions on Education, vol. 6, Issue 3, pp. 3-19 (May 1, 2006).
Ross, D.F., "Replenishment Inventory Planning," Chapter 7 of Distribution Planning and Control: Managing in the Era of Supply Chain Management, Chapman & Hall, pp. 263-319 (1996).
Wah, B.W., "Wiley Encyclopedia of Computer Science and Engineering," Wiley-Interscience, vol. 1, pp. 1-2365 (Nov. 2008) Part 1.
Wah, B.W., "Wiley Encyclopedia of Computer Science and Engineering," Wiley-Interscience, vol. 1, pp. 1-2365 (Nov. 2008) Part 2.
Wah, B.W., "Wiley Encyclopedia of Computer Science and Engineering," Wiley-Interscience, vol. 1, pp. 1-2365 (Nov. 2008) Part 3.
Wah, B.W., "Wiley Encyclopedia of Computer Science and Engineering," Wiley-Interscience, vol. 1, pp. 1-2365 (Nov. 2008) Part 4.
Wah, B.W., "Wiley Encyclopedia of Computer Science and Engineering," Wiley-Interscience, vol. 1, pp. 1-2365 (Nov. 2008) Part 5.
Wah, B.W., "Wiley Encyclopedia of Computer Science and Engineering," Wiley-Interscience, vol. 1, pp. 1-2365 (Nov. 2008) Part 6.
Wah, B.W., "Wiley Encyclopedia of Computer Science and Engineering," Wiley-Interscience, vol. 1, pp. 1-2365 (Nov. 2008) Part 7.
Wah, B.W., "Wiley Encyclopedia of Computer Science and Engineering," Wiley-Interscience, vol. 1, pp. 1-2365 (Nov. 2008) Part 8.
Wah, B.W., "Wiley Encyclopedia of Computer Science and Engineering," Wiley-Interscience, vol. 1, pp. 1-2365 (Nov. 2008) Part 9.

(56) References Cited

OTHER PUBLICATIONS

Wah, B.W., "Wiley Encyclopedia of Computer Science and Engineering," Wiley-Interscience, vol. 1, pp. 1-2365 (Nov. 2008) Part 10.
Wah, B.W., "Wiley Encyclopedia of Computer Science and Engineering," Wiley-Interscience, vol. 1, pp. 1-2365 (Nov. 2008) Part 11.
Wah, B.W., "Wiley Encyclopedia of Computer Science and Engineering," Wiley-Interscience, vol. 1, pp. 1-2365 (Nov. 2008) Part 12.
Wah, B.W., "Wiley Encyclopedia of Computer Science and Engineering," Wiley-Interscience, vol. 1, pp. 1-2365 (Nov. 2008) Part 13.
"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.
Non-Final Office Action dated Apr. 24, 2017, for U.S. Appl. No. 14/700,044, of Brock, Z., et al., filed Apr. 29, 2015.
Non-Final Office Action dated Jun. 15, 2017, for U.S. Appl. No. 14/289,467, of Kumar, A., et al., filed May 28, 2014.
Non-Final Office Action dated Jun. 30, 2017, for U.S. Appl. No. 14/522,208, of Cieri, M., et al., filed Oct. 23, 2014.
Final Office Action dated Sep. 6, 2017, for U.S. Appl. No. 14/700,044, of Brock, Z., et al., filed Apr. 29, 2015.
Advisory Action dated Nov. 9, 2017, for U.S. Appl. No. 14/700,044, of Brock, Z., et al., filed Apr. 29, 2015.
Final Office Action dated Nov. 22, 2017, for U.S. Appl. No. 14/289,467, of Kumar, A., et al., filed May 28, 2014.
Final Office Action dated Nov. 24, 2017, for U.S. Appl. No. 14/522,208, of Cieri, M.M., et al., filed Oct. 23, 2014.
Non-Final Office Action dated Jan. 26, 2018, for U.S. Appl. No. 14/800,090, of Tsou, V., filed Jul. 15, 2015.
Non-Final Office Action dated Feb. 5, 2018, for U.S. Appl. No. 14/700,013, of Brock, Z., et al., filed Apr. 29, 2015.
Advisory Action dated Feb. 6, 2018, for U.S. Appl. No. 14/289,467, of Kumar, A., et al., filed May 28, 2014.
Non-Final Office Action dated Apr. 10, 2018, for U.S. Appl. No. 14/700,044, of Brock, Z., et al., filed Apr. 29, 2015.
Non-Final Office Action dated Apr. 18, 2018, for U.S. Appl. No. 14/289,467, of Kumar, A., et al., filed May 28, 2014.
Non-Final Office Action dated Jul. 6, 2018, for U.S. Appl. No. 14/800,021, of Tsou, V., filed Jul. 15, 2015.
Final Office Action dated Jul. 26, 2018, for U.S. Appl. No. 14/800,090, of Tsou, V., filed Jul. 15, 2015.
Non-Final Office Action dated Aug. 6, 2018, for U.S. Appl. No. 14/964,231, of Jen, M., et al., filed Dec. 9, 2015.
Final Office Action dated Aug. 15, 2018, for U.S. Appl. No. 14/700,013, of Brock, Z., et al., filed Apr. 29, 2015.
Non Final Office Action dated Sep. 20, 2019, for U.S. Appl. No. 14/800,090, of Tsou, V., filed Jul. 15, 2015.
Non-Final office Action dated Jun. 12, 2020, for U.S. Appl. No. 14/800,021, of Tsou, V., filed Jul. 15, 2015.
Advisory Action dated Jun. 22, 2020, for U.S. Appl. No. 14/800,090, of Tsou, V., filed Jul. 15, 2015.
Non Final Office Action dated Jun. 29, 2020, for U.S. Appl. No. 14/964,263, of Jen, M., et al., filed Dec. 9, 2015.
Non-Final Office Action dated Jul. 15, 2020, for U.S. Appl. No. 14/700,013, of Brock, Z., et al., filed Apr. 29, 2015.
Final Office Action dated Jul. 16, 2020, for U.S. Appl. No. 16/051,257, of Capers M., et al., filed Jul. 31, 2018.
Final Office Action dated Mar. 20, 2020, for U.S. Appl. No. 14/800,090, of Tsou, V., filed Jul. 15, 2015.
Non Final Office Action dated Mar. 26, 2020, for U.S. Appl. No. 16/431,671, of Kumar, A., et al., filed Jun. 4, 2019.
Advisory Action dated Mar. 30, 2020, for U.S. Appl. No. 14/964,263, of Jen, M., et al., filed Dec. 9, 2015.
Final Office Action dated Dec. 27, 2019, for U.S. Appl. No. 14/522,208, of Cieri, M.M., et al., filed Oct. 23, 2014.
Final Office Action dated Jan. 22, 2020, for U.S. Appl. No. 14/964,263, of Jen, M., et al., filed Dec. 9, 2015.
Final office Action dated Jan. 29, 2020, for U.S. Appl. No. 14/800,021, of Tsou, V., filed Jul. 15, 2015.
Non Final Office Action dated Mar. 10, 2020, for U.S. Appl. No. 16/051,257, of Capers M., et al., filed Jul. 31, 2018.
Advisory Action dated Sep. 18, 2020, for U.S. Appl. No. 16/051,257, of Capers M., et al., filed Jul. 31, 2018.

\* cited by examiner

INTELLIGENT INVENTORY RECOMMENDATIONS

BACKGROUND

Many merchants utilize images to depict products that the merchants sell in the course of business. Often, the images are stock images that do not accurately reflect the actual product the merchant sells. In order to accurately reflect each individual product, the merchant would either have to take a photo of each product and upload the photo into an application or the like or search the Internet for an image that accurately depicts the item and includes appropriate licensing for the merchant's use. However, both options for identifying an accurate portrayal of each inventory item would take a significant amount of time for the merchant. That is, conventional techniques for generating image collections for use by merchants are inefficient due to the number of interactions required between merchants and existing image repositories. Additionally, both options may require a significant amount of network bandwidth to identify images related to the merchant's entire inventory and/or upload the images.

Once the items of inventory are offered for sale, merchants may track a number of items of inventory they maintain in stock. Some items offered by merchants may include expiration dates, which must additionally be tracked. Often, merchants track the number of items and expiration dates associated therewith manually, such as by inputting the information into a ledger or in-house inventory management program. The manual input and tracking of inventory and expiration dates can be very time consuming, inefficient, and inconvenient for the merchant.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
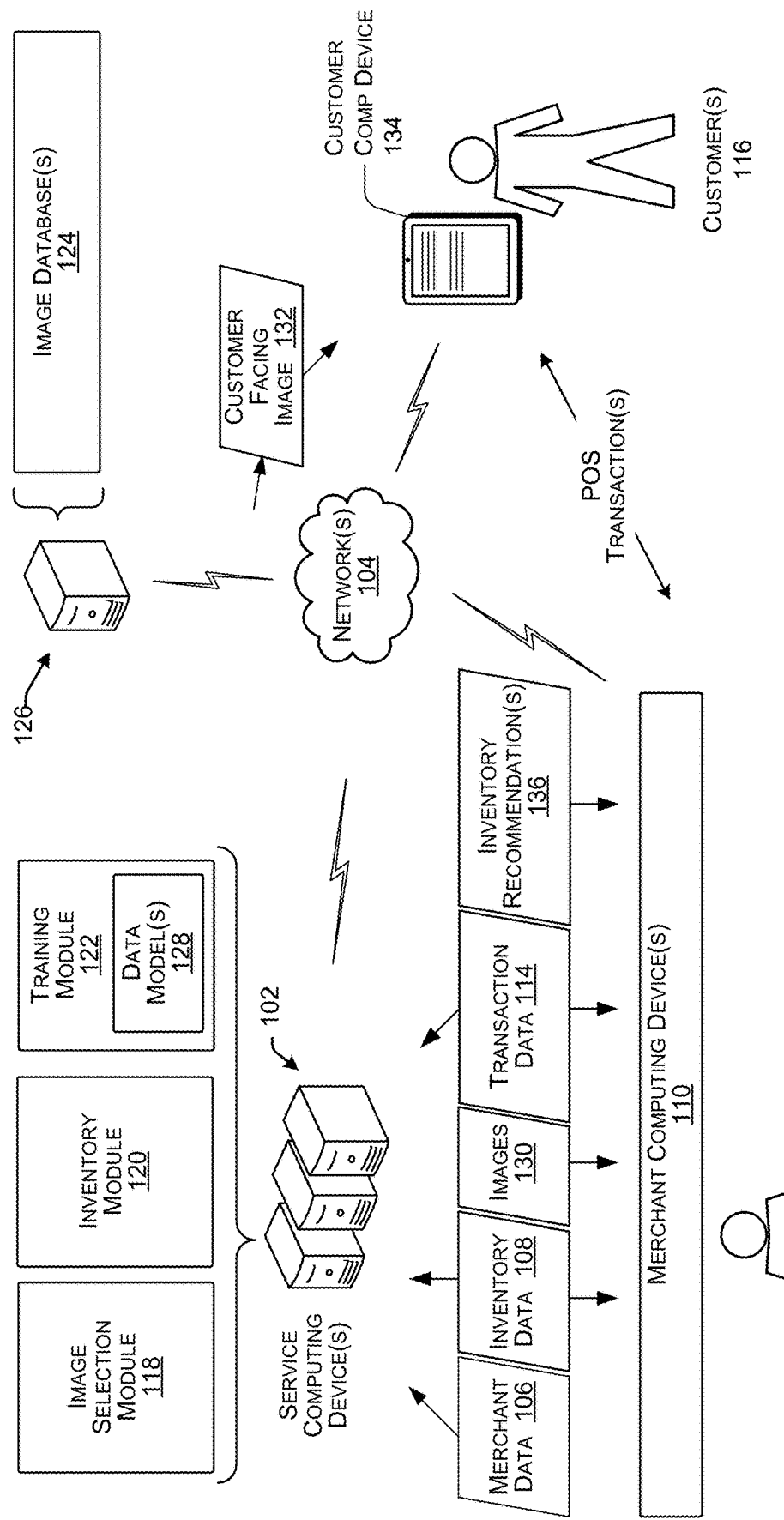
FIG. 1 illustrates an example environment of an inventory management system configured to provide recommendations to merchants related to a merchant inventory.

Techniques described herein are directed to an intelligent inventory management system provided by a service provider and configured to assist a merchant in intelligently generating a display of merchant inventory items. The inventory management system may provide recommendations to merchants of images to use in developing a catalog of inventory items. An image may include a visual representation of an item of inventory. For instance, in at least one example, the inventory management system may analyze a description of an item and identify images that are most representative of the item. The inventory management system may determine a first image to use as a merchant-facing image to display to a merchant on a merchant device and a second image to use as a customer-facing image to display to a customer on the merchant device and/or a customer device associated with the customer. The images may be used as representations of the item, for example, when the merchant is conducting transactions with customers. In various examples, the inventory management system may receive and analyze transaction data associated with the transactions and may monitor an inventory of the item that the merchant has in stock and/or expiration dates associated therewith. In some examples, the inventory management system may be configured to intelligently provide recommendations of actions for the merchant to perform, for instance, to encourage sales of particular inventory items based at least in part on expiration dates associated therewith.

A service provider may receive inventory data (e.g., type, code (e.g., universal product code (UPC), etc.), colors, manufacturer(s), make, model, and/or style associated with an item of inventory, a number of a particular item in inventory, turnover rate, sales velocity, profit margins, etc.) from a merchant. The merchant may send the inventory data during an onboarding process (e.g., joining a service provided by the service provider), when the merchant acquires a new item of inventory, and/or when the merchant receives an order of one or more items of inventory from a third-party source (i.e., not via the service provider). In various examples, the service provider may determine inventory data based on transaction data (e.g., items sold in transactions, quantities of items, prices of items, discounts applied, payment methods, etc.) received from a merchant device of a merchant In some examples, the service provider may derive the inventory data from the transaction data. For example, the service provider may determine a number of items remaining in a merchant inventory based on a number of items in the inventory prior to the transaction and a number of items sold during the transaction.

In various examples, at least partly in response to receiving the inventory data, the service provider may analyze one or more databases to identify one or more images that are representative of the item. In some examples, the service provider may compare the inventory data to a description and/or characteristics associated with images in the database(s) to identify the image(s). In some examples, the service provider may utilize machine learning techniques to identify the image(s). In some examples, an identification of the image(s) may be based on a similarity score between the inventory data and one or more characteristics associated with the image(s) exceeding a threshold. In such examples, machine learning techniques may be utilized to train a model for calculating and/or outputting the similarity score associated with image(s).

In various examples, the database(s) analyzed by the service provider may include database(s) of images stored by the service provider. In such examples, the images may include images of inventory items provided by a plurality of merchants associated with the service provider. In various examples, the plurality of images may have associated therewith licenses authorizing use by other merchants associated with the service provider. In such examples, the service provider may request that the plurality of merchants sign an agreement authorizing use by other merchants. For example, a merchant may capture images of items in a merchant inventory and may upload the captured images, and a description associated therewith, to the database of the service provider. Responsive to receiving the upload, the service provider may cause a licensing agreement to surface on a merchant computing device, requesting authorization of use of the images by other merchants associated with the service provider. Responsive to receiving the acceptance of the licensing agreement, the service provider may store the captured images and the descriptions associated therewith in the database(s).

In some examples, the database(s) may include database(s) of images stored by one or more third-party website(s) (e.g., Unsplash®, Pixabay™, etc.). The third-party website(s) may include databases storing open source images (e.g., images dedicated to the public domain, royalty-free images, attribution free images, etc.) and/or non-open source images. In various examples, the service provider may be configured to verify appropriate licensing of the images prior to identification as an image that is representative of the item. For example, the service provider may verify that the image is licensed to Creative Commons zero (CC0), is associated with a public domain equivalent license, and/or other license for public use.

In various examples, based at least in part on identification of image(s) representative of an item and/or verification of appropriate licensing associated therewith, the service provider may associate the image(s) with the respective inventory item. In some examples, based on the identification of the image(s) representative of the item and/or verification of appropriate licensing associated therewith, the service provider may send the image(s) to the merchant for approval. In such examples, responsive to receiving an approval from the merchant, the service provider may associate the image(s) with the item.

In at least one example, the image(s) may include a merchant-facing image and a customer-facing image. The merchant-facing image may be an image used to represent the item on a user interface of a merchant computing device, for example, when the merchant is conducting a transaction. The customer-facing image may include an image used to represent the item to a customer on a user interface of a merchant computing device and/or a customer computing device. The customer-facing image may include an image that is more detailed, accurate, and/or aesthetically pleasing than the merchant-facing image. For example, the merchant-facing image may include a black and white non-detailed depiction of the item and the customer-facing image may include a color image with details specific to the item.

In various examples, based on an association of the merchant-facing image with the item, the service provider may cause the user interface of the merchant computing device to render the merchant-facing image on a display. In some examples, the merchant-facing image may include an interactive icon that is selectable by a merchant, for example, in the course of conducting a transaction. In some examples, the interactive icon may be associated with a merchant application configured to communicate transaction data, inventory data, and/or other data associated with the merchant to the service provider. In some examples, the merchant application may be an application managed by the service provider.

In some examples, based on an association of the customer-facing image with the item, the service provider may cause a user interface of a merchant device to render the customer-facing image on a display. In such examples, the display may include a display configured for viewing by the customer. In some examples, based on the association of the customer-facing image with the item, the service provider may cause a user interface of a customer device to render the customer-facing image on a display. The user interface may correspond to an application and/or a website associated with the merchant, for example, providing a means by which the customer may conduct a transaction with the merchant. In various examples, the customer-facing image may include an interactive icon that is selectable by a customer. In some examples, a selection of an interactive icon may correspond to the customer selecting the item associated therewith, such as to purchase the item, receive additional information, or the like.

Additionally and/or alternatively, the service provider may be configured to manage an inventory associated with a merchant and provide recommendations to the merchant to encourage sales of particular items. In some examples, the recommendations may be based on expiration data associated with the particular items. As discussed above, the service provider may receive inventory data from a merchant. The inventory data may be sent as an initial data upload, for example, during an onboarding process, and/or as an update to a merchant inventory (e.g., recently received item, etc.). In some examples, the inventory data may include expiration data (e.g., expiration date, sell-by date, use-by date, best if used by date, etc.) associated with respective items. The expiration data may be set by the manufacturer, supplier, service provider, and/or the merchant. For example, a milk supplier may stamp a use-by date on a carton of milk. The merchant may input that date as the expiration data associated with the carton of milk. For another example, a merchant may have a policy to sell milk at least one week prior to the use-by date. The merchant may thus input a date one week prior to the use-by date as the expiration data. For yet another example, the service provider may store merchant preferences associated with a merchant in a datastore, such as in a merchant profile. The merchant may indicate, as a preference, that dairy products are to be sold at least two weeks prior to a use-by date indicated by the supplier. Responsive to an upload of the use-by date associated with a block of cheese from the merchant, the service provider may access merchant profile and determine that the expiration data includes a date two-weeks prior to the use-by date.

As discussed above, the service provider may receive transaction data from a plurality of merchants including the merchant. The transaction data may include items sold in the transaction, quantities of each item, a price associated with each item, discounts applied, payment methods used by the customer (e.g., credit card, debit card, gift card, cash, etc.). Based at least in part on receiving transaction data associated with the merchant, the service provider may update an inventory of the merchant. For example, the service provider may determine that three gallons of milk with a use-by date of October 1 were sold by the merchant in a transaction with a customer. The service provider may update a total number of gallons of milk with the use-by date in the merchant inventory based on the three gallons of milk sold in the transaction.

In various examples, the service provider may track the inventory associated with the merchant and may identify one or more items that are due to expire within a threshold period of time (e.g., three days, one week, two weeks, one month, etc.). The threshold period of time may be determined by the service provider and/or the merchant. In some examples, the threshold period of time associated with an item may be based on a particular item (e.g., milk, coffee, tea bags, batteries, wine, detergent, etc.), a type of item (e.g., dairy product, wheat product, etc.), and/or a merchant preference.

In various examples, the service provider may be configured to send the merchant a notification that one or more items of inventory is due to expire within respective threshold periods of time. In various examples, the notification may include a recommendation of one or more actions for the merchant to perform to encourage a sale of the soon-to-be expired item(s). The action(s) may include offering the item(s) for sale at a discount, changing a location associated with the item(s) in a merchant location (e.g., store), adjusting a location associated with the item on a listing of merchant offerings (e.g., digital listing, menu, etc.), changing a display associated with the item(s), combining the item(s) with other items offered for sale, offering a promotion with the sale of the item(s) (e.g., buy one get one free, additional free item with purchase, etc.).

In some examples, the service provider may identify the action(s) based on sales rates of soon-to-be expired item(s) (e.g., inventory items determined to be within the threshold period of time before expiration) sold by similar merchants (e.g., different merchants from the merchant). The similar merchants may include merchants that are separate legal entities from the merchant and do not share accounting data, finances, or the like. In various examples, the service provider may compare inventory data and/or merchant data associated with the merchant to inventory data and/or merchant data associated with other merchants to identify the similar merchant(s). In some examples, the similar merchant(s) may be identified based on the merchants sharing a merchant category code (MCC), an item of inventory, a merchant type, or the like. In some examples, the service provider may utilize clustering analysis and/or machine learning techniques to train a data model to identify the similar merchant(s). In some examples, the similarity may be based on a similarity score between merchants exceeding a threshold. In such examples, the machine learning techniques may be utilized to train a model for calculating and/or outputting a similarity score associated with merchants.

In various examples, the one or more actions for the merchant to perform may be identified based at least in part on transaction data and/or sales data associated with the similar merchant(s). In such examples, the service provider may determine action(s) performed by similar merchant(s) that correspond to a most successful sales rate and/or total sales of soon-to-be expired items sold by similar merchants. For example, the service provider may determine that, for similar merchants, moving a display of soon-to-be expired items to a front of a store resulted in a largest percentage of the soon-to-be expired items sold. In various examples, the service provider may utilize machine learning techniques to train a data model to identify the action(s) for the merchant to perform, such as based on data corresponding to the similar merchant(s).

In various examples, the service provider may send the notification regarding the soon-to-be expired item(s) to a merchant computing device associated with the merchant in a communication, such as via electronic mail, text, an application, (e.g., merchant application, social media application, etc.), a dashboard, a telephone call, etc. In some examples, the service provider may be configured to cause the notification to surface on a user interface of the merchant computing device, such as in a merchant application.

Additionally or alternatively, based at least in part on receiving the inventory data of a merchant, the service provider may be configured to recommend one or more additional items for the merchant to add to an inventory. In some examples, the recommendation to add the additional item(s) may be based on additional items sold by similar merchants. In such examples, and as discussed above, the service provider may be configured to identify one or more similar merchants based on inventory data and/or transaction and/or utilizing clustering analysis and/or machine learning techniques. In various examples, the service provider may analyze inventory data associated with the similar merchant(s) to identify one or more items that are offered for sale by the similar merchant(s) but not the merchant (e.g., additional items).

In various examples, the service provider may analyze transaction data associated with the similar merchant(s) to determine sales data (e.g., sales rate (e.g., a number sold per day, per week, etc.), a profit margin, an amount of customer attention (e.g., clicks on an image associated with an item, inquiries about the item, etc.), or the like) associated with the item(s) that are offered for sale by the similar merchant(s). In some examples, the service provider may identify one or more additional items that have sales data above a threshold value. For example, an additional item may be identified based on a sales rate associated with the item being above a threshold sales rate (e.g., 5 per day, 7 per week, etc.). For another example, an additional item may be identified based on a profit margin being above a threshold profit margin (e.g., $1 per unit of item sold, $5 per unit item sold, etc.).

Based at least in part on a determination that the sales data associated with the additional item(s) is above a threshold value, the service provider may generate a recommendation for the merchant to add the additional item(s) to a merchant inventory. In some examples, the service provider may send the recommendation in a communication, such as via electronic mail, text, an application, (e.g., merchant application, social media application, etc.), a dashboard, a telephone call, etc. In some examples, the service provider may be configured to cause the communication to surface on a user interface of the merchant computing device, such as in a merchant application.

In some examples, the service provider may receive an acceptance from the merchant of the recommendation to add an additional item to the merchant inventory. Responsive to receiving the acceptance, the service provider may place an order for the additional item on behalf of the merchant, for shipment to a merchant location associated with the merchant. In various examples, based in part on receiving the acceptance, the service provider may automatically determine a quantity of the additional item (e.g., 5, 10, 20, 30, etc.) to order for the merchant and/or automatically order the additional item(s) for the merchant.

In some examples, the service provider may receive a request from the merchant to order the additional item, such as, from a supplier. In some examples, the request may include a quantity of the additional item to order. Based at least in part on the service provider ordering the additional item for the merchant, the service provider may update the merchant inventory with inventory data associated with the additional item. In some examples, the merchant may receive the recommendation to order the additional item and may order the additional item from a supplier. In such examples, the merchant may send the service provider an inventory data update including details about the additional item (e.g., inventory data associated with the additional item).

Techniques described herein offer various improvements to existing inventory management systems. As discussed above, merchants may spend a significant amount of time online searching for images that accurately depict items of inventory offered for sale by the merchant. After identifying the images, the merchant would then send the identified images and/or links to an online location of the identified images (e.g., for the service provider to access) to the service provider for association with respective inventory items. However, utilizing the improved inventory management system, the merchants may not be required to search for images and/or upload the images and/or links to the service provider, thereby reducing an amount of network bandwidth required to identify and associate images representative of items of inventory. Accordingly, the techniques described herein increase an amount of network bandwidth available for other network traffic.

Additionally, the traditional means of associating images to items of inventory described above require a significant amount of processing power and/or storage space associated with a merchant computing device. For example, a processor of a merchant computing device may be required to execute a large number of instructions to search through multiple webpages and images located thereon, download images from the webpages, store images, upload the images to the service provider, etc. The storage of the images alone may require gigabytes of storage in a database of the merchant computing device that would otherwise be available for other data. Because the improved inventory management system removes the requirement for the merchant to search, download, store, and/or upload images, the improved inventory management system provides for an increased amount of processing power and/or storage space to be available on the merchant computing device. Thus, the techniques described herein improve the functioning of the merchant computing device.

Furthermore, as discussed above, traditional inventory management systems require a merchant to manually input and track a merchant inventory, and expiration dates associated therewith, in a merchant database. This manual input and tracking of the inventory and expiration dates can require a significant amount of processing power and/or storage space of the merchant computing device. Because the improved inventory management system described herein manages the merchant inventory for the merchant, the techniques described herein may further increase an amount of processing power and/or storage space available for other programs to run and/or data to be stored on the merchant computing device. Thus, the techniques described herein may further improve the functioning of the merchant computing device.

FIG. 1 illustrates an example environment 100 of an inventory management system configured to provide recommendations to merchants related to a merchant inventory. The inventory management system may include one or more service computing devices 102. In various examples, the service computing device(s) 102 may be configured to communicate with other devices in a distributed computing resource (not illustrated). Service computing device(s) 102 may include a variety of device types configured to communicate via one or more networks 104 and are not limited to a particular type of device. In some examples, device 102 may include stationary devices, including but not limited to servers, desktop computers, personal computers, work stations, and thin clients, such as those capable of operating in a distributed computing resource. In some examples, service computing device(s) 102 may include mobile devices, including but not limited to mobile phones, tablet computers, laptop computers, and any other mobile computers or mobile telecommunication devices. In various examples, service computing device(s) 102 may include any other sort of computing device configured to communicate via the one or more networks 104.

In various examples, network(s) 104 can include public networks such as the internet, private networks such as an institutional and/or personal network or some combination of public and private networks. Network(s) 104 can also include any type of wired and/or wireless network, including but not limited to local area networks (LAN), wide area networks (WAN), satellite networks, cable networks, Wi-Fi networks, WiMax networks, mobile communications networks (e.g., 3G, 4G, etc.), or any combination thereof. Network(s) 104 can utilize communications protocols, including packet-based and/or datagram-based protocols, such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateway access points, firewalls, base stations, repeaters, backbone devices, and the like.

In some examples, network(s) 104 may further include devices that can enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth) and other standards.

In various examples, the service computing device(s) 102 may receive merchant data 106 and/or inventory data 108 from one or more merchant computing devices 110 associated with one or more merchants 112. The merchant data 106 may include a type of merchant, a size of merchant (e.g., a number of employees, a number of point of sale devices used by the merchant, square footage of brick and mortar store, etc.), merchant appointments, inventory (e.g., types of goods and services, amounts of products sold, turnover rate, sales velocity, profit margins, etc.), processing patterns, a type of point of sale device used by the merchant, a location associated with the merchant, customer data (e.g., frequent customers, rewards programs, customer demographics, etc.), and/or any other information used to describe the merchant and/or merchant business. The inventory data 108 may include an inventory type, a code (e.g., universal product code (UPC), etc.), color(s), manufacturer(s), make, model, and/or style associated with an item of inventory, a quantity of a particular item in inventory, turnover rate, sales velocity, profit margins, or the like.

In various examples, the service computing device(s) 102 may receive the merchant data 106 and/or the inventory data 108 from the merchant computing device(s) 110 responsive to the merchant(s) 112 establishing an account and/or signing up for a service offered by a service provider (e.g., onboarding to the service provider) associated with the service computing device(s) 102. In some examples, the service computing device(s) 102 may receive the merchant data 106 and/or the inventory data 108 from the merchant computing device(s) 110 based on an update to an existing merchant account and/or service provided by the service provider. For example, a merchant 112 may add a new item of inventory into a merchant inventory. Based on the addition of a new item of inventory, the merchant 112 may send an update of inventory data 108 to the service computing device(s) 102, the update including details regarding the new item of inventory (e.g., inventory data corresponding thereto).

In some examples, the service computing device(s) 102 may derive at least some of the merchant data 106 and/or inventory data 108 from transaction data 114 received from the merchant computing device(s) 110. The transaction data 114 may include sales data for an individual sale (e.g., products sold in a sale, payment method used by a customer, amount of a sale, time associated with transaction), historical sales data (e.g., frequency of sales, average amount per sale, most frequent product sold, etc.), and any other data related to one or more transactions performed between the merchant 112 and one or more customers 116. For example, the service computing device(s) 102 may determine a number of items remaining in a merchant inventory based on a number of items in the inventory prior to the transaction and a number of items sold during a transaction.

In some examples, the service computing device(s) 102 may store the merchant data 106, the inventory data 108, and/or the transaction data 114 in one or more databases accessible by an image selection module 118, an inventory module 120, and/or a training module 122. In various examples, the merchant data 106, the inventory data 108, and/or the transaction data 114 may be stored in the database(s) in a merchant profile associated with the merchant 112. In some examples, the merchant data 106, the inventory data 108, and/or the transaction data 114 may be stored in the database(s) based on a merchant classification, such as an MCC, merchant type, a merchant inventory, or the like.

In various examples, responsive to receiving the inventory data 108, the image selection module 118 may analyze a description associated with an item of inventory. The description may include one or more descriptors associated with the item, such as a name, type of item, code associated with item (e.g., UPC), a manufacturer, make, model, material size, color, design, serial number, or any other details used to describe the item. For example, descriptors associated with a particular coffee mug may include ceramic, 16 oz, white, tapered, bicycle design, stylistic words "I wheelie like you."

In various examples, the image selection module 118 may access one or more image databases 124 to identify one or more images representative of the item of inventory. In various examples, the image(s) may include visual representations of the item. The visual representations may include bitmaps (e.g., fixed matrix of pixels, "raster graphics," etc.), vector graphics (e.g., parametric models, etc.), or the like. For example, visual representations for items "blue T-shirt" and "red T-shirt" could be encoded as two separate bitmaps (e.g., two JPEG files), and/or a single vector graphic (e.g., a representation of contours of a T-shirt) as well as coloring schemas to represent the blue and red colors of the T-shirts. In various examples, vector graphics may include a two-step process of identifying the vector graphic at the item level (e.g., model of a T-shirt) and generating instructions for a final rendering (e.g., coloring schemes, layer treatments, target image size, etc.). In such examples, the final rendering may be associated at a variation level (e.g., specific color, material, size of a T-shirt). In some examples, the final rendering could be performed by the image selection module 118 (e.g., server side) and/or at by a merchant, such as on a merchant POS device (e.g., client side).

In some examples, the image database(s) 124 may be stored on the service computing device(s) 102. In some examples, the image database(s) 124 may be stored and maintained by one or more remote computing devices 126. In some examples, the remote computing device(s) 126 may include one or more computing devices managed by the service provider, such as in a distributed computing resource. In various examples, the image database(s) 124 may include images of inventory items provided by the merchant(s) 112. In some examples, the images may be uploaded by the merchant(s) 112 for association with the inventory items in a merchant catalog (e.g., visual depiction of merchant inventory). The images may be stored based on one or more descriptors associated with the items, a merchant classification associated with the merchant 112, a merchant profile, and/or the like.

In some examples, the remote computing device(s) 126 may include computing devices managed by a third-party, such as for use by a website, application, or the like). The third-party website(s) may include databases storing open source images (e.g., images dedicated to the public domain, royalty-free images, attribution free images, etc.) and/or non-open source images. In some examples, the image selection module 118 may communicate with the remote computing device 126 to access the images stored on the image database(s) 124. For example, the remote computing device(s) 126 may include a computing device configured to manage a website of images available for public use (e.g., licensed for public use), the images being stored on the image database(s) 124. The image selection module 118 may connect with the remote computing device(s) 126 via the network(s) 104, and access the images stored on the image database(s) 124.

The image selection module 118 may identify the image(s) representative of the item based on an analysis of the images stored on the image database(s) 124. In some examples, the image selection module 118 may analyze descriptors associated with the images and/or other image data (e.g., pixel dimensions, sharpness, noise, exposure range, contrast, color accuracy, distortion, etc.) associated with the images. In some examples, the image data may represent at least the quality of an image.

In various examples, the image selection module 118 may identify one or more images in the image database(s) 124 that have the same or similar descriptors as the item. In some examples, an identification of the image(s) may be based on a number of shared descriptors between the item and the image(s). In some examples, the identification may be based on the item and the image(s) sharing particular descriptors. For example, the image selection module 118 may identify image(s) based on descriptors associated therewith matching an item a product code, material, size, and color.

In various examples, the service computing device(s) 102 may utilize machine learning techniques to train a data model to identify the image(s) that are representative of the item. In such examples, the training module 122 may access merchant data 106, inventory data 108, and/or transaction data 114 stored in the database(s) and may process the data to train one or more data models 128 to identify image(s)

representative of items. As will be discussed in further detail below with regard to FIG. 4, in such examples, the training module 122 may utilize machine learning techniques to train the data model(s) 128. Additionally, or in the alternative, the data model(s) 128 may utilize one or more statistical models for processing data and determining an outcome (e.g., an image).

In some examples, the data model(s) 128 may analyze the descriptors associated with the item to identify images that are representative of the item. In some examples, the data model(s) 128 may identify images that are most representative of the item. In various examples, the data model(s) 128 may rank one or more images that are determined to be representative of the item. In such examples, the highest ranked image may include the image that is most representative of the item.

In various examples, the images may be identified, at least in part, based on images used to represent a same or similar item in a merchant inventory of one or more similar merchants. In such examples, the data model(s) 128 may additionally be trained to identify the similar merchant(s). In some examples, the similar merchant(s) may be identified based on similarities with regard to respective merchant data 106, inventory data 108, and/or transaction data 114. In various examples, the data model(s) 128 may be trained to calculate a similarity score with respect to merchants based on the respective merchant data 106, inventory data 108, and/or transaction data 114. In some examples, the one or more similar merchants to the merchant may be determined based on a similarity score associated therewith exceeding a threshold similarity score.

In at least one example, the image selection module 118 and/or the data model(s) 128 may identify two images 130 representative of the item. The two images 130 may include a merchant-facing image and a customer facing image 132. The merchant-facing image may be an image used to represent the item on a user interface of a merchant computing device 110, for example, when the merchant is conducting a transaction. The customer-facing image 132 may include an image used to represent the item to a customer on a user interface of a merchant computing device 110 and/or a customer computing device 134. The customer-facing image 132 may include an image that is more detailed, accurate, and/or aesthetically pleasing than the merchant-facing image. For example, the merchant-facing image may include a black and white non-detailed depiction of the item and the customer-facing image 132 may include a color image with details specific to the item.

In various examples, an identification of the two images 130 may be based at least in part on a determination that the images 130 have associated therewith, an appropriate license for use by the merchant and/or service provider. In some examples, an appropriate license may include a license for use in the public domain (e.g., licensed to Creative Commons zero (CC0), license issued to public domain, etc.). In various examples, the image selection module 118 may be configured to access metadata associated with the images 130 to determine licensing associated therewith.

In some examples, an appropriate license may include a license authorizing use by merchants associated with the service provider. For example, the image database(s) 124 may include a plurality of images provided by a plurality of merchants associated with the service provider. Responsive to receiving the plurality of images from the plurality of merchants, the service provider may request that the plurality of merchants agree to respective licensing agreements authorizing use by other merchants. The service provider may store the plurality of images in the image database(s) 124 based at least in part on receiving an acceptance of the licensing agreements from the plurality of merchants.

In various examples, the image selection module 118 may send the images 130 to the merchant computing device 110 associated with the merchant 112. In some examples, the images 130 may be sent to the merchant computing device 110 with a recommendation to associate the images 130 with the item, such as in a merchant catalog (e.g., merchant inventory, display of merchant inventory, etc.). The images 130 and/or recommendation associated therewith may be sent in a communication, such as via electronic mail, text, an application, (e.g., merchant application, social media application, etc.), a dashboard, a telephone call, etc. In some examples, the image selection module 118 may be configured to cause the images 130 and/or recommendation to surface on a user interface of the merchant computing device 110, such as in a merchant application.

In some examples, the communication may provide a means by which the merchant 112 may approve (e.g., accept) or deny one or both of the images 130. Responsive to a denial of one or both of the images 130, the image selection module 118 and/or the data model(s) 128 may identify one or more other images that are representative of the item. In some examples, the image selection module 118 and/or the data model(s) 128 may identify an image ranked below (e.g., in chronological order) the image denied by the merchant 112. In some examples, the image selection module 118 and/or the data model(s) 128 may perform a new analysis of the description of the item and/or images in the image database(s) 124, to identify another image 130 to recommend to the merchant 112.

Responsive to receiving an approval of the images 130, the image selection module 118 may associate the images 130 with the item, such as in a database. In at least one example, the association may be stored in a merchant catalog of inventory, such as that stored in a merchant profile. The merchant catalog may represent inventory associated with the merchant, such that when conducting a transaction or searching an inventory, a merchant 112 and/or customer 116 may access visual depictions of the inventory items to assist in a determination of whether to buy and/or to verify the item is what is intended.

In various examples, the merchant may access the merchant-facing image of the images 130 via a merchant application. As discussed above, the merchant-facing image may include an image comprising a level of detail required to accurately identify the item. At least in part because the merchant is familiar with the inventory, the quality of the merchant-facing image may be less than that of the customer-facing image 132. A benefit of a lesser quality image with respect to the merchant-facing image is that the images 130 stored on a database of the merchant computing device 110 will not require as much storage space. Additionally, the less detailed images allow a merchant application or other program through which the merchant-facing images are displayed to load and run faster, permitting faster processing speeds and allowing for a higher transaction rates (e.g., transactions processed per hour).

In some examples, the merchant may additionally access the customer-facing image 132 via the merchant computing device(s) 110. In various examples, the merchant 112 may provide a merchant computing device 110 via which the customer 116 may access depictions of the merchant inventory (e.g., merchant catalog). In some examples, the customer 116 may utilize the merchant computing device 110 to identify one or more items for purchase. In some examples, the customer 116 may utilize the merchant computing device 110 to review products purchased during a transaction. In such examples, the customer 116 may view the customer-facing image 132 on a display of the merchant computing device 110 while conducting a transaction with the merchant 112.

In various examples, the customer 116 may access the customer-facing image 132 on a customer computing device 134, such as via an application or website. For example, the customer 116 may access a website associated with the merchant 112 to purchase items in a transaction. The website may contain one or more customer facing images 132 for viewing and selection by the customer 116. In various examples, the image selection module 118 may send the customer-facing image 132 to the customer computing device 134, such as responsive to a customer inquiry about the item, the customer 116 placing the item on a wish list, an indication of customer interest in the item, a new item added to an inventory of the merchant 112, a customer preference stored in a customer profile, or the like.

As discussed above, the service computing device(s) 102 may additionally include an inventory module 120 configured to manage a merchant inventory, such as, for example, providing an inventory management service. In various examples, the inventory module 120 may be configured to manage a merchant catalog associated with the merchant 112. In such examples, based at least in part on an identification and/or acceptance of the images 130 by the merchant 112, the inventory module 120 may associate the images 130 with the respective item in the merchant catalog. The images 130 may thus be accessible by the merchant 112 and/or the customer 116 via the merchant catalog.

Additionally or alternatively, the inventory module 120 may be configured to receive transaction data 114 from the merchant computing device 110. The transaction data may be representative of a transaction conducted between the merchant 112 and the customer 116. In some examples, the merchant computing device 110 may send the transaction data 114 to the service computing device(s) 102 to assist in processing the transaction. In such examples, the service computing device(s) 102 may be configured to receive authorization for a transfer of funds between the customer 116 and the merchant 112. Based at least in part on determining an authorization for the transaction and/or a successful completion of the transaction, the inventory module 120 may update an inventory associated with the merchant (e.g., a quantity of items in the inventory remaining after the transaction).

In various examples, the inventory module 120 may be configured to monitor expiration dates (e.g., expiration data, sell-by date, use-by date, etc.) associated with items remaining in the merchant inventory. In some examples, the inventory module 120 may receive expiration dates associated with the items from the merchant 112, such as in an initial upload of inventory data. In some examples, the merchant 112 may send the expiration data as an update to the merchant inventory. For example, the merchant may add a new item, such as for a temporary period, and the merchant may send inventory data along with expiration data to the service computing device 102 to update the merchant inventory and/or provide expiration data to the inventory management system. In various examples, the inventory module 120 may receive inventory data corresponding to a new item of inventory. In such examples, the inventory module 120 may determine an expiration date of the new item of inventory based at least in part on one or more other items of inventory of the merchant inventory.

In some examples, the inventory module 120 may determine the expiration date of the new item of inventory based on an expiration date of the same or a similar item in a merchant inventory corresponding to a similar merchant. The inventory module 120 may determine that an item is the same or similar to the new item based on the respective inventory data associated therewith. The items may be determined to be the same or similar based on the items sharing a predetermined number of descriptors, sharing particular descriptors (e.g., product code, name, etc.), merchant identification of same or similar items, other merchants associated with the service provider identifying the items as the same or similar, or the like. In various examples, the training module 122 may be configured to train the data model(s) 128 to identify one or more same or similar items. In such examples, the data model(s) 128 may analyze the items and determine a level of similarity between the two. Based at least in part on the level of similarity being within a threshold level of similarity, the data model(s) 128 may determine that the items are the same or similar. In various examples, the training module 122 may be configured to train the data model(s) 128 to determine expiration data based on data associated with inventory items across multiple similar merchants.

The inventory module 120 may determine that an expiration date associated with an item falls within a threshold period of time (e.g., five days, ten days, three weeks, one month, etc.) of a current date and/or time. The threshold period of time may be determined by the service provider and/or the merchant. In some examples, the threshold period of time associated with an item may be based on a particular item (e.g., milk, coffee, tea bags, batteries, wine, detergent, etc.), a type of item (e.g., dairy product, wheat product, etc.), and/or a merchant preference. For example, the merchant 112 may determine that the threshold period of time associated with an item is two-weeks prior to an expiration date associated therewith. The inventory module 120 may thus set the threshold period of time based on the merchant preference.

In various examples, the inventory module 120 may be configured to send the merchant 112 an inventory recommendation 136 regarding the one or more items of inventory that is due to expire within respective threshold periods of time. In various examples, the inventory recommendation 136 may include a notification that the item(s) of inventory are due to expire within the respective threshold periods of time. In some examples, the inventory recommendation 136 may be sent to the merchant computing device 110 via a communication, such as via electronic mail, text, an application, (e.g., merchant application, social media application, etc.), a dashboard, a telephone call, etc. In some examples, the service provider may be configured to cause the inventory recommendation 136 to surface on a user interface of the merchant computing device, such as in a merchant application.

In some examples, the inventory recommendation 136 may include one or more actions for the merchant 112 to perform to encourage a sale of a particular item that is due to expire within the threshold period of time. In such examples, the inventory module 120 may be configured to determine the action(s). The action(s) may include offering the item(s) for sale at a discount, changing a location associated with the item(s) in a merchant location (e.g., store), adjusting a location associated with the item on a listing of merchant offerings (e.g., digital listing, menu, etc.), changing a display associated with the item(s), combining the item(s) with other items offered for sale, offering a promotion with the sale of the item(s) (e.g., buy one get one free, additional free item with purchase, etc.).

In various examples, the inventory module 120 may determine the action(s) based on actions previously performed by similar merchant(s). In some examples, the action(s) may be based on successful actions previously performed by similar merchant(s), such as those that resulted in a high percentage of sales. In some examples, the inventory module 120 may be configured to monitor inventory and/or transaction data associated with similar merchants and sales data associated with the soon-to-be expired items. In various examples, the inventory module 120 may determine, based at least in part on sales corresponding to actions, the success of a particular action corresponding to a particular item. In some examples, the success may be based on a threshold percentage (e.g., 25%, 50%, 75%, etc.) of a soon-to-be expired item being sold. In some examples, the inventory module 120 may rank actions associated with the particular item of inventory for similar merchant(s) based on sales data associated therewith. In such examples, the recommended action(s) may be based in part on the ranking. For example, a first action may result in four of the five soon-to-be expired items being sold while a second action may result in seven of the ten soon-to-be expired items being sold. Based on the sales data, the first action may be ranked higher than the second action.

In various examples, the data model(s) 128 may be trained by the training module 122 to determine the action(s) to recommend to the merchant 112. In some examples, the training module 122 may train the data model(s) 128 with training data including actions performed by similar merchants responsive to expiration dates. In such examples, the data model(s) 128 may be configured to output one or more actions determined to be successful based on the similar merchant(s).

In various examples, the action(s) may include physical actions for the merchant to perform, such as moving a location of an item and/or adjusting a position of a digital representation of the item on a listing of merchant offerings. In some examples, the action(s) may include an action to perform with respect to a computing device, such as adjusting a display associated with the item to reflect an offer of the item at a discount. In some examples, the inventory module 120 may be configured to receive a selection of an action by the merchant 112. Responsive to receiving the selection, the inventory module 120 may cause the merchant application or other program displaying items of inventory to reflect the action, such as, for example, displaying the discount associated with the item.

Additionally or alternatively, the inventory recommendation(s) 136 may include one or more additional items for the merchant 112 to add to the merchant inventory. In various examples, the inventory module 120 may be configured to identify the additional item(s) for the merchant 112 to add to the merchant inventory. In various examples, the inventory module 120 and/or the data model(s) 128 may identify the additional item(s) for the merchant 112. The identification may be based on inventories and/or transaction data associated with similar merchants. In at least one example, the inventory module 120 may analyze inventory data associated with the similar merchant(s) to identify one or more items that are offered for sale by the similar merchant(s) but not the merchant (e.g., additional items). The inventory module 120 may then analyze transaction data associated with the similar merchant(s) to determine sales data (e.g., sales rate (e.g., a number sold per day, per week, etc.), a profit margin, an amount of customer attention (e.g., clicks on an image associated with an item, inquiries about the item, etc.), or the like) associated with the additional item. In some examples, the identification may be based on the additional item having sales data above a threshold value. For example, an additional item may be identified based on a sales rate associated with the item being above a threshold sales rate (e.g., 13 per day, 100 per week, etc.). For another example, an additional item may be identified based on a profit margin being above a threshold profit margin (e.g., $3 per unit of item sold, $15 per unit item sold, etc.).

In various examples, the data model(s) 128 may be trained by the training module 122 to identify the additional item. In some examples, the training module 122 may train the data model(s) 128 with training data including transaction data and/or sales data associated with the additional item offered for sale by similar merchants. In such examples, the data model(s) 128 may be configured to output the additional item to recommend to the merchant 112.

Based at least in part on an identification of the additional item, the inventory module 120 may generate the inventory recommendation(s) 136 including the additional item(s). In some examples, the inventory module 120 may send the inventory recommendation(s) 136 in a communication, such as via electronic mail, text, an application, (e.g., merchant application, social media application, etc.), a dashboard, a telephone call, etc. In some examples, the inventory module 120 may be configured to cause the communication to surface on a user interface of the merchant computing device 110, such as in a merchant application.

Figure 2:
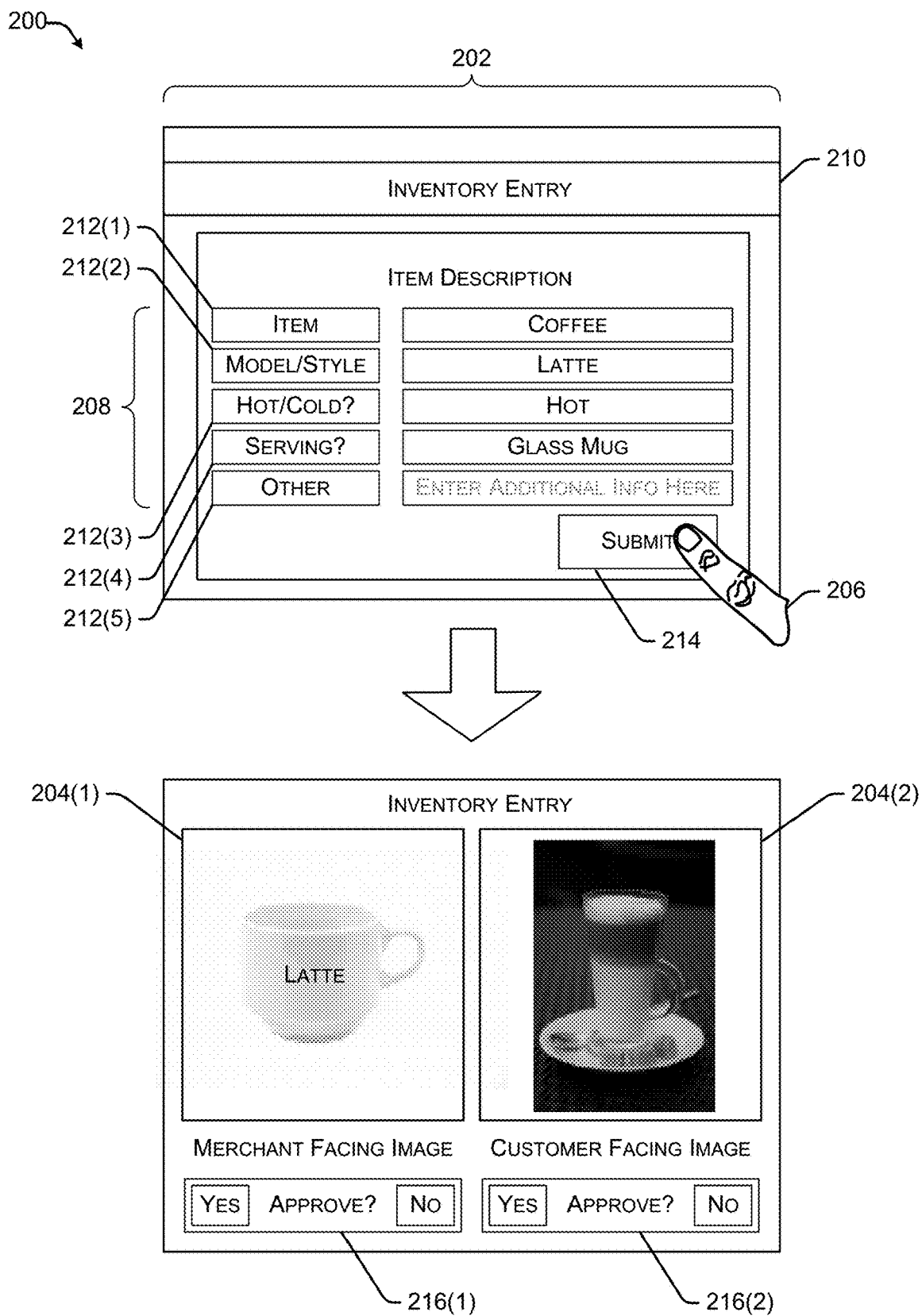
FIG. 2 illustrates an example user interface for submitting items of inventory and selecting images representative of the items of inventory.

FIG. 2 illustrates an example merchant computing device 200 configured with a user interface 202 for submitting items of inventory and selecting images 204 representative of the items of inventory. The images 204 may include visual representations of the item (e.g., bitmaps (e.g., fixed matrix of pixels, "raster graphics," etc.), vector graphics (e.g., parametric models, etc.), or the like). As discussed above, a merchant 206, such as merchant 112, may send merchant data and/or inventory data 208 to a service computing device, such as service computing device 102. In various examples, the merchant may send the merchant data and/or inventory data 208 during an onboarding process, such as establishing an account, or a new service offered by a service provider associated with the service computing device. In some examples, the merchant may send the merchant data and/or inventory data 208 as an update to an existing merchant account, merchant inventory, and/or service provided by the service provider.

In various examples, the merchant may upload inventory data to the service provider via the user interface 202. The user interface 202 may be associated with a merchant application, a website associated with the service provider and/or the merchant, and/or another program configured for data transfer between the merchant computing device 200 and a service provider. In various examples, the merchant may input inventory data 208 associated with a particular item into an "Inventory Entry" page 210. In the illustrative example, the Inventory Entry page 210 of the user interface 202 includes user entries 212 for an item name 212(1), model/style 212(2), whether it is hot or cold 212(3), how it is served 212(4), and other information 212(5). In various examples, the user entries 212 may include inputs of descriptors associated with the particular item. In various examples, the user entries 212 associated with an initial entry may be pre-determined by the service provider. In such examples, the user entries 212 on an Inventory Entry page 210 may be fixed (e.g., the same for all items of inventory).

In various examples, one or more of the user entries 212 may be dynamically determined based on one or more other user entries 212. In some examples, the service provider may dynamically determine the one or more other user entries by pulling inventory data 208 from the user interface after each user entry 212 is entered by the merchant 206. In various examples, the service provider may process each user entry 212 to determine whether additional information (e.g., additional particular descriptors) about the item would assist in classification and/or describing the item. The additional information may include descriptors that are specific to the particular item. In various examples, a data model of the service computing device may be trained, such as by a training module, to identify additional information to request from a merchant regarding a particular item. In some examples, the service computing device may determine the additional information, such as based on a tree-like graph or model related to the particular item. For example, a merchant 206 may input the item name 212(1) is coffee and model/style 212(2) as latte. Based on the entries 212(1) and/or 212(2), the service provider may determine that additional information, such as whether the latte is hot or cold and how it is served, may assist in identifying the item. The service provider may thus cause the hot/cold 212(3), how it is served 212(4) user entries to surface on the user interface 202. In various examples, responsive to receiving other information 212(5), the service provider may cause one or more other user entries 212 to surface on the user interface 202 to gather more information about the particular item. In such examples, the one or more other user entries 212 may surface on the Inventory Entry page 210 and/or another page associated with the user interface 202.

In various examples, the merchant 206 may send the inventory data 208 to the service computing device by selecting a selectable option 214. In such examples, the merchant 206 may push the data to the service computing device. In the illustrative example, the selectable option 214 is labeled "submit." In other examples, the selectable option 214 may include a different label. In various examples, responsive to receiving the inventory data 208, such as by a push and/or pull of the data, the service computing device may identify images 204 representative of the particular item. As described above with regard to FIG. 1, the images 204 may be identified based on an analysis of a plurality of images in one or more image databases. The image databases may include databases stored by the service provider, such as those including images provided by one or more merchants associated with the service provider, and/or databases managed by a third-party, such as on a website including a plurality of images. In various examples, the service provider may be configured to add images to the image database. In such examples, the service provider may identify images 204 representative of items of inventory offered for sale by merchants associated with the service provider, such as those stored by a third-party service provider, and may download the images 204 for storage in an image database managed by the service provider. In various examples, the service computing device may send the images 204 to the merchant computing device 200. In some examples, the service computing device may cause the images 204 to surface on the user interface 202.

As discussed above, the visual representations may include bitmaps (e.g., fixed matrix of pixels, "raster graphics," etc.), vector graphics (e.g., parametric models, etc.), or the like. For example, visual representations for items "blue T-shirt" and "red T-shirt" could be encoded as two separate bitmaps (e.g., two JPEG files), and/or a single vector graphic (e.g., a representation of contours of a T-shirt) as well as coloring schemas to represent the blue and red colors of the T-shirts. In various examples, vector graphics may include a two-step process of identifying the vector graphic at the item level (e.g., model of a T-shirt) and generating instructions for a final rendering (e.g., coloring schemes, layer treatments, target image size, etc.). In such examples, the final rendering may be associated at a variation level (e.g., specific color, material, size of a T-shirt). In some examples, the final rendering could be performed by the service computing device prior to sending the image(s) 204 to the merchant computing device 200. In some examples, the final rendering may be performed by the merchant, such as via the user interface. In such examples, the service computing device may provide the merchant with the vector graphic and the instructions for the final rendering. The merchant may subsequently complete the final rendering and send the data to the service computing device for association with the item.

The images 204 may include a merchant-facing image 204(1) and a customer-facing image 204(2). The merchant-facing image 204(1) may be an image identified to represent the item on the user interface 202 of the merchant computing device 200, for example, when the merchant 206 is conducting a transaction. The customer-facing image 204(2) may include an image used to represent the item to a customer on a user interface of the merchant computing device 200 and/or a customer computing device. As illustrated in FIG. 2, the customer-facing image 204(2) may include an image that is more detailed, accurate, and/or aesthetically pleasing than the merchant-facing image 204(1).

In various examples, based at least in part on identifying the images 204, the service provider may recommend the merchant-facing image 204(1) and a customer-facing image 204(2) to the merchant 206, for association with the particular item. In various examples, the recommendation may be based in part on a verification of appropriate licensing of the image by the service provider. In such examples, the service provider may verify that a license associated with the merchant-facing image 204(1) and customer-facing image 204(2) may authorize use for the respective representations.

In various examples, the recommendation to associate the images 204 with the particular item may be sent to the merchant 206 via a communication, such as via electronic mail, text, an application, (e.g., merchant application, social media application, etc.), a dashboard, a telephone call, etc. In the illustrative example, the service provider causes the images 204 to surface on the user interface 202 of the merchant computing device 200.

In various examples, the service provider may automatically associate the images 204 with the particular item based on an identification of the images and/or verification of appropriate licensing. In some examples, the service provider may request an approval 216 of one or both of the images 204. As illustrated in FIG. 2, the service provider may cause the approvals 216(1) and 216(2) to surface on the user interface 202. Responsive to receiving a selection of "Yes" in the approvals 216(1) and/or 216(2), the service provider may associate the respective approved images 204(1) and 204(2) with the particular item. Although illustrated together on the user interface 202, the merchant-facing image 204(1) and the customer facing image 204(2) may be surfaced separately, one at a time.

Figure 3:
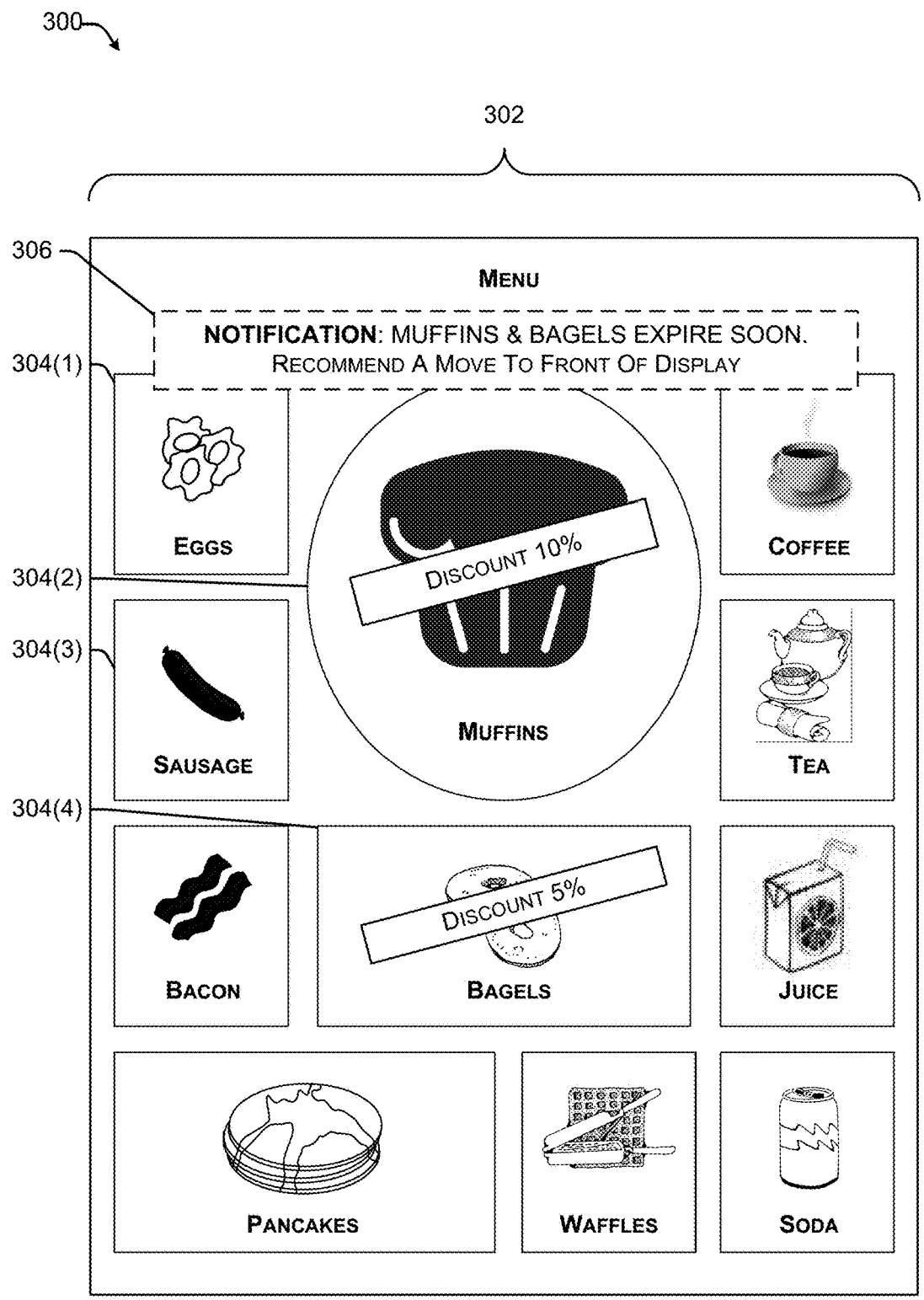
FIG. 3 illustrates an example user interface for providing inventory recommendations to a merchant.

FIG. 3 illustrates an example merchant computing device 300 configured with a user interface 302 for providing inventory recommendations to a merchant In various examples, the user interface 302 may include a user interface associated with a merchant application, such as to conduct a transaction, display menu items, or the like. In various examples, the images 304 may represent items of inventory offered for sale by the merchant. For example, image 304(1) may represent eggs, 304(2) may represent muffins, 304(3) may represent sausages, and 304(4) may represent bagels offered on a merchant menu (e.g., inventory, catalog, etc.). In various examples, images 304 may include interactive icons configured to be selected by a merchant and/or customer, such as when ordering an item during a transaction. The images 304 may represent merchant facing images, such as merchant-facing image 204(1), or customer-facing images, such as customer-facing images 132 and 204(2).

In various examples, a service computing device, such as service computing device 102 may receive transaction data from the merchant computing device 300. The transaction data may be representative of a transaction conducted between the merchant and the customer. For example, a customer may order eggs and sausages from a merchant. Responsive to the order, the merchant may select image 304(1) and 304(3) to process in a transaction. In some examples, the merchant computing device 300 may send the transaction data to the service computing device to assist in processing the transaction. In such examples, the service computing device may be configured to receive authorization for a transfer of funds between the customer and the merchant. Based at least in part on determining an authorization for the transaction and/or a successful completion of the transaction, the service computing device may update an inventory associated with the merchant (e.g., a quantity of items in the inventory remaining after the transaction).

In various examples, the service computing device may be configured to monitor expiration dates (e.g., expiration data, sell-by date, use-by date, etc.) associated with items remaining in the merchant inventory. As discussed above, the service computing device may receive expiration dates associated with the items from the merchant, such as in an initial upload of inventory data. In some examples, the merchant may send the expiration data as an update. In various examples, the service computing device may receive inventory data corresponding to a new item of inventory. In such examples, the service computing device may determine an expiration date of the new item of inventory based at least in part on one or more other similar items of inventory of the merchant inventory. For example, the merchant may receive a delivery of bagels as a new inventory item. The service computing device may determine that bagels are similar to muffins and should have similar expiration data. Based on the similarity between the two, the service computing device may determine the expiration date associated with the bagels. In some examples, the service computing device may determine the expiration date of the new item of inventory based on an expiration date of the same or a similar item in a merchant inventory corresponding to a similar merchant.

In various examples, the service computing device may determine that an item is the same or similar to the new item based on the respective inventory data associated therewith. The items may be determined to be the same or similar based on the items sharing a predetermined number of descriptors, sharing particular descriptors (e.g., product code, name, etc.), merchant identification of same or similar items, other merchants associated with the service provider identifying the items as the same or similar, or the like. In various examples, one or more data models may analyze the items and determine a level of similarity between the two. Based at least in part on the level of similarity being within a threshold level of similarity, the data model(s) may determine that the items are the same or similar.

In various examples, service computing device may determine that an expiration date associated with an item falls within a threshold period of time (e.g., five days, ten days, three weeks, one month, etc.) of a current date and/or time. The threshold period of time may be determined by the service provider and/or the merchant. In some examples, the threshold period of time associated with an item may be based on a particular item (e.g., milk, coffee, tea bags, batteries, wine, detergent, etc.), a type of item (e.g., dairy product, wheat product, etc.), and/or a merchant preference. For example, the merchant may determine that the threshold period of time associated with an item is two-weeks prior to an expiration date associated therewith. The service computing device may thus set the threshold period of time based on the merchant preference.

In various examples, the service computing device may be configured to send the merchant a notification 306 that one or more items of inventory is due to expire within respective threshold periods of time (e.g., soon-to-be expired items). In the illustrative example, the notification is sent to the merchant computing device 300 as a notification in the merchant application. In such an example, the service computing device may cause the notification 306 to surface on the user interface 302 (e.g., on the display) of the merchant computing device 300. In other examples, the notification may be sent to the merchant computing device via a communication, such as via electronic mail, text, an application, (e.g., merchant application, social media application, etc.), a dashboard, a telephone call, etc.

In various examples, responsive to receiving the notification, the merchant computing device 300, such as through the merchant application may adjust an image 304 associated with the soon-to-be expired item. In some examples, the service computing device may be configured to cause the merchant computing device 300 and/or merchant application to adjust the image 304 associated with the soon-to-be expired item. An adjustment may include a change in size, shape, color, highlighting, outline, text associated therewith, or other adjustment to the image 304 and/or icon associated therewith. In the illustrative example, the image 304(2) corresponding to muffins is enlarged and is a different shape than other icons, to emphasize the soon-to-be expired muffins. Similarly, the image 304(4) corresponding to bagels is enlarged to emphasize the soon-to-be expired bagels.

In various examples, the adjustment may be based at least in part on a time remaining until the expiration date and/or time. For example, items may expire (e.g., best sold by time, merchant preference to sell by, etc.) at a certain hour on a day, such as 12 hours after delivery. In the illustrative example, the muffins may correspond to an expiration date/time that is before a bagel expiration date/time. Accordingly, the image 304(2) corresponding to the muffins may be emphasized (e.g., larger, different shape, etc.) more than the image 304(4) corresponding to the bagels.

In some examples, the service computing device may be configured to determine one or more action(s) for the merchant 112 to perform to encourage a sale of a particular item that is due to expire within the threshold period of time. The action(s) may include offering the item(s) for sale at a discount, changing a location associated with the item(s) in a merchant location (e.g., store), adjusting a location associated with the item on a listing of merchant offerings (e.g., digital listing, menu, etc.), changing a display associated with the item(s), combining the item(s) with other items offered for sale, offering a promotion with the sale of the item(s) (e.g., buy one get one free, additional free item with purchase, etc.).

In various examples, the service computing device may determine the action(s) based on actions previously performed by similar merchant(s). In some examples, the action(s) may be based on successful actions previously performed by similar merchant(s), such as those that resulted in a high percentage of sales. In some examples, the service computing device may be configured to monitor inventory and/or transaction data associated with similar merchants and sales data associated with the soon-to-be expired items. In various examples, the service computing device may determine, based at least in part on sales corresponding to actions, the success of a particular action corresponding to a particular item. In some examples, the success may be based on a threshold percentage (e.g., 25%, 50%, 75%, etc.) of a soon-to-be expired item being sold. In some examples, the service computing device may rank actions associated with the particular item of inventory for similar merchant(s) based on sales data associated therewith. In such examples, the recommended action(s) may be based in part on the ranking. For example, a first action may result in four of the five soon-to-be expired items being sold while a second action may result in seven of the ten soon-to-be expired items being sold. Based on the sales data, the first action may be ranked higher than the second action.

In various examples, the data model(s) may be trained by the training module to determine the action(s) to recommend to the merchant. In some examples, the training module may train the data model(s) with training data including actions performed by similar merchants responsive to expiration dates. In such examples, the data model(s) may be configured to output one or more actions determined to be successful based on the similar merchant(s).

In various examples, the notification 306 that the item(s) of inventory are due to expire within respective threshold periods of time may include a recommendation for the merchant to perform the action(s). In the illustrative example, the action(s) may include physical actions for the merchant to perform, such as moving a location of an item to a front of a display containing the muffins and/or bagels. In some examples, the action(s) may include an action to perform with respect to a computing device, such as adjusting a display associated with the item to reflect an offer of the item at a discount In such examples, the merchant may adjust an image 304(2) and/or 304(4) to emphasize and/or highlight the soon-to-be expired items.

As illustrated in FIG. 3, one of the one or more actions may include offering the soon-to-be expired items at a discount. In some examples, the discount (e.g., an amount, percentage, two-for-one, etc.) may be determined by the service computing device and provided to the merchant, such as in the notification 306. In some examples, the merchant may determine the discount associated with each soon-to-be expired item. In some examples, the merchant may advertise the discount on the user interface 302, such as by causing the merchant application to display the discount on the image(s) 304(2) and 304(4). In some examples, the merchant may advertise the discount aurally, and/or via a separate and distinct display, sign, or the like.

In various examples, the service computing device may to adjust an image 304 associated with the soon-to-be expired icon on the user interface 302. In such examples, the service computing device may be configured to cause the merchant application or other program displaying items of inventory to reflect the action, such as, for example, displaying the discount associated with the item. In some examples, the service computing device may automatically adjust the image 304 based on a determination that an expiration date associated therewith is within the threshold period of time. For example, the service computing device may automatically adjust the size and shape of the image 304(2) corresponding to the muffin and the image 304(4) corresponding to the bagels. Additionally, in examples, in which one of the one or more options includes offering the soon-to-be expired item at a discount, the service computing device may determine the discount associated with each soon-to-be expired item. For example, based at least in part on the muffins expiring before the bagels, the muffins may be discounted at 10% and the bagels discounted at 5%. In some examples, the service computing device may cause the respective discounts to render on the user interface 302 of the merchant computing device 300, for viewing by the merchant and/or customer.

In various examples, the service computing device may provide one or more selectable options of action(s) on the user interface 302. In such examples, the service computing device may be configured to receive a selection from the merchant of one or more of the recommended action(s). In various examples, responsive to receiving a selectable option of an action to adjust an image 304 associated with a soon-to-be expired item, the service computing device may adjust the image 304 on the user interface 302. In such examples, the service computing device may be configured to cause the merchant application or other program displaying items of inventory to reflect the action, such as, for example, displaying the discount associated with the item. For example, as illustrated, the service computing device may adjust the size and shape of the image 304(2) corresponding to the muffin and the image 304(4) corresponding to the bagels. Additionally, the service computing device may determine discounts associated with each soon-to-be expired item and cause the merchant computing device 300 to render the discounts on the display. For example, based at least in part on the muffins expiring before the bagels, the muffins may be discounted at 10% and the bagels discounted at 5%. The service computing device may cause the respective discounts to render on the user interface 302 of the merchant computing device 300, for viewing by the merchant and/or customer.

In various examples, the service computing device may be configured to receive feedback regarding action(s) performed by the merchant and/or service computing device with regard to soon-to-be expired items. In various examples, the service computing device may determine one or more actions performed by the merchant. In some examples, the merchant may inform the service computing device of an action performed related to the soon-to be expired item. In some examples, the merchant may select a selectable option of one or more action(s). In such examples, based on the selection, the service computing device may determine the actions performed by the merchant and/or service computing device with regard to the soon-to-be expired item. In various examples, the service computing device may monitor transaction data with regard to the soon-to-be expired items. In various examples, the service computing device, such as via the training module and/or data model(s), may be configured to learn from the transaction data and may determine an efficacy of a suggested action.

Figure 4:
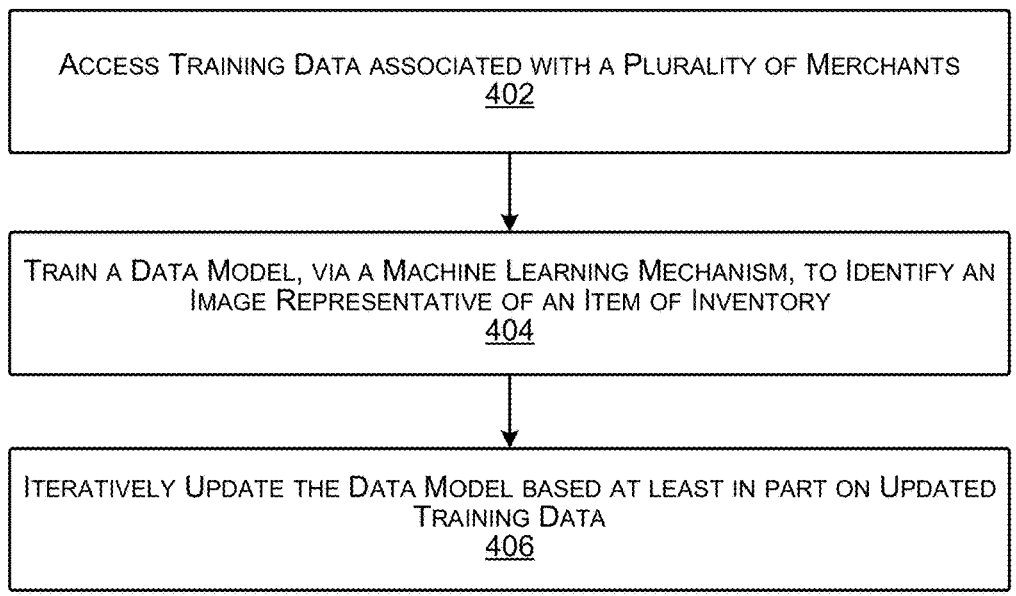
FIG. 4 is a flow diagram illustrating an example process for training a data model to identify an image representative of an item of inventory.

FIG. 4 is a flow diagram illustrating an example process 400 for training a data model to identify an image representative of an item of inventory. FIG. 4 is described in the context of the environments and device(s) described above with reference to FIGS. 1-3, but is not limited to such environments and device(s).

Block 402 illustrates accessing training data associated with a plurality of merchants. As described above, the training module may train one or more data models leveraging machine learning mechanisms. In at least one example, the training module may access the training data. The training data may include merchant data, inventory data, and/or transaction data associated with the plurality of merchants, as described above. Furthermore, the training data may include image data (e.g., descriptors) associated with particular images, the image data describing at least in part, an item that the image represents. In some examples, the training data may include previous associations between the images and items in which they represent, and/or the efficacy of the associations. In some examples, the efficacy of the associations may be based, at least in part on sales data associated therewith. For example, a customer-facing image may receive a significant amount of customer attention (e.g., many clicks, scrolls over details, etc.) with a relatively high conversion rate (e.g., sales resulting from customer attention). Based on the customer attention and/or sales data, the training module may use the customer-facing image representative of an item to train the data model.

In some examples, the training data may be based in part on merchant feedback with regard to one or more images. In some examples, the merchant feedback may be based in part on an approval or denial of the recommended image, such as that illustrated and described with regard to FIG. 2. In some examples, the merchant feedback may include a merchant survey, transaction entry times versus number of items in the transaction (e.g., speed of selection of images during a transaction), requests for alternative images received from the merchant, or the like.

Block 404 illustrates training a data model via a machine learning mechanism, to identify an image representative of an item of inventory. The image may include a merchant-facing image and/or a customer-facing image. The training module may train a data model based on a plurality of training data items such that, given a new input of merchant data, inventory data, transaction data, and/or training data associated with a merchant, the data model may output an image representative of the item of inventory.

In at least one example, the training module may utilize a machine learning mechanism to train the data model. In such an example, the data model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In various examples, the image identification may be based on statistical analyses of merchant characteristics. For instance, the training module may utilize techniques, such as k-means clustering, etc. to determine images most often used by similar merchants to represent the item of inventory.

Block 406 illustrates iteratively updating the data model based on updated training data. In at least one example, the training module may receive updated training data. For instance, training module may receive updated training data after a lapse of a predetermined period of time, at a particular frequency, etc. The updated training data can include updated merchant data, inventory data, transaction data, sales data, or the like. Furthermore, the updated training data may indicate whether a previously determined image output by the data model was accurate. In at least one example, training module may receive updated training data and may re-train the data model based at least partly on the updated training data.

Figure 5:
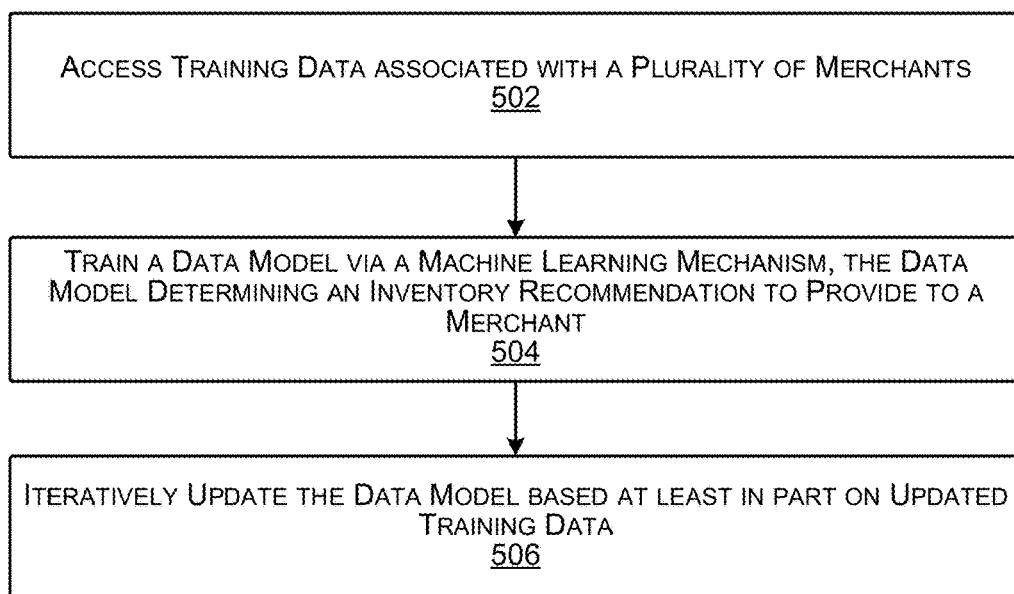
FIG. 5 is a flow diagram illustrating an example process for training a data model to determine an inventory recommendation to provide to a merchant.

FIG. 5 is a flow diagram illustrating an example process 500 for training a data model to determine an inventory recommendation to provide to a merchant. FIG. 5 is described in the context of the device(s) described above with reference to FIGS. 1-3, but is not limited to such device(s).

Block 502 illustrates accessing training data associated with a plurality of merchants. As described above, the training module may train one or more data models leveraging machine learning mechanisms. In at least one example, the training module may access training data. The training data may include merchant data, inventory data, and/or transaction data corresponding to a plurality of transactions between a plurality of merchants and the plurality of customers, as described above. Additionally, the training data may include sales data corresponding to actions performed by a merchant and/or similar merchants with respect to soon-to-be expired items.

Block 504 illustrates training a data model via a machine learning mechanism, the data model determining an inventory recommendation to provide to the merchant. The training module may train the data model based on a plurality of training data items such that, given a new input of merchant data, inventory data, and/or transaction data, the data model may output an inventory recommendation for the merchant. The recommendation may include an action to perform with respect to a soon-to-be expired item. Additionally or alternatively, the recommendation may include a recommendation to add a new item of inventory. The recommendation may be based on inventory data and/or sales data corresponding to one or more similar merchants. In various examples, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

Block 506 illustrates iteratively updating the data model based at least in part on updated training data. In at least one example, the training module may receive updated training data. For instance, training module may receive updated training data after a lapse of a predetermined period of time, at a particular frequency, etc. The updated training data may include updated transaction data, inventory data, merchant data, sales data, or the like. In at least one example, training module may receive updated training data and can re-train the data model based at least partly on the updated training data.

Figure 6:
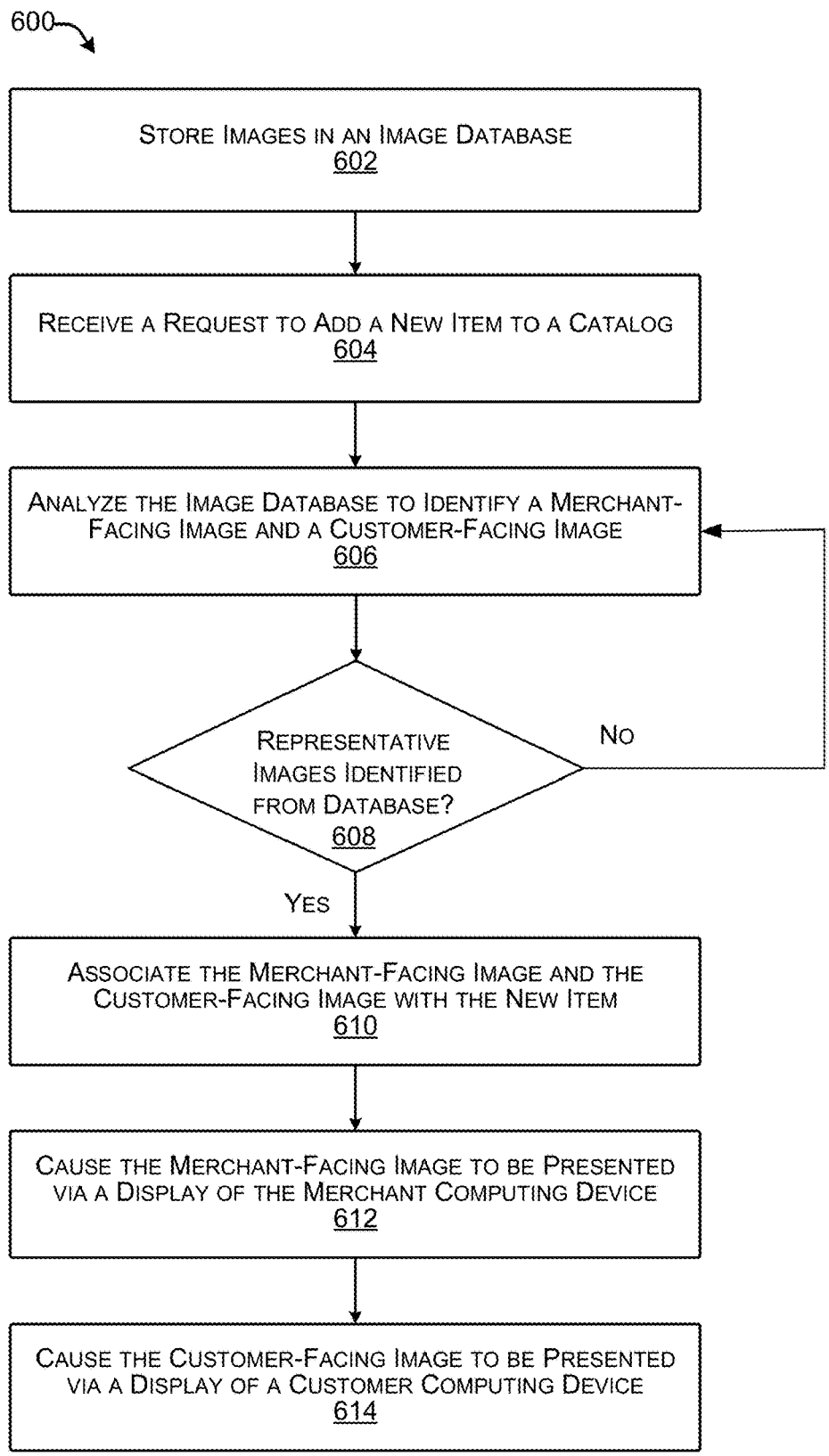
FIG. 6 is a flow diagram illustrating an example process for identifying an image representative of an item of inventory.

FIG. 6 is a flow diagram illustrating an example process 600 for identifying an image representative of an item of inventory. The example process 600 may be performed by a service computing device, such as service computing device 102, associated with a service provider. The process 600 may be performed by one or more components of the service computing device, as described below with regard to FIG. 10.

Block 602 illustrates storing images in an image database. In various examples, the service computing device may receive a plurality of images from a plurality of merchants associated with the service provider. In such examples, the service computing device may store the plurality of images in the image database, such as image database 124.

In various examples, prior to storing the images in the image database, the service provider may request acceptance, from a respective merchant, of a license for use by other merchants. In such examples, the service computing device may send a licensing agreement to the respective merchant for signature. Based at least in part on receiving a signed licensing agreement, the service computing device may store the images in the image database.

Block 604 illustrates receiving a request to add a new item to a catalog (e.g., merchant inventory). The catalog may include a merchant inventory associated with a merchant and may represent the items of inventory offered for sale by the merchant. In various examples, the merchant may send the request to add the new item via a merchant application on a merchant computing device.

Block 606 illustrates the system analyzing the image database to identify a merchant-facing image and a customer-facing image. That is, the image database is queried and analyzed to identify the most relevant images pertaining to the new item. The merchant-facing image and the customer-facing image may be representative of the new item added to the catalog. The merchant-facing image may be an image used to represent the item on a user interface of a merchant computing device, for example, when the merchant is conducting a transaction. The customer-facing image may include an image used to represent the item to a customer on a user interface of a merchant computing device and/or a customer computing device. The customer-facing image may include an image that is more detailed, accurate, and/or aesthetically pleasing than the merchant-facing image.

In various examples, the service computing device may analyze descriptors associated with the item and/or the images in the database to identify the merchant-facing and customer facing images. In some examples, the service computing device may analyze metadata associated with the images in the database to identify the merchant-facing and customer facing images. In some examples, the service computing device may analyze images used by one or more similar merchants to represent the item. In such examples, the identification of the merchant-facing and customer facing images may be based at least in part on images used by similar merchants.

At block 608, the service computing device may determine whether representative images from the database are identified. That is, the service computing device may determine whether relevant merchant-facing images and customer-facing images were identified from the database. Based on a determination that representative images were not identified ("No" at block 608), the service computing device may continue to analyze the database to identify images representative of the item, such as depicted at block 606. In some examples, the service computing device may analyze a second database of images. For example, a first database may be associated with the service computing device. Based on a determination that no images representative of the item were identified in the first database, the service computing device may expand a search to a second database of images located on a remote database, such as one associated with a website of images.

In some examples, upon identifying the images representative of the item (e.g., relevant merchant-facing image and customer-facing image), the service computing device may provide a recommendation to the merchant to associate the merchant-facing image and the customer-facing image with the new item. In various examples, the recommendation may be based in part on a verification of appropriate licensing of the image by the service provider. In such examples, the service provider may verify that a license associated with the merchant-facing image and customer-facing image may authorize use by the merchant for the respective representations.

In various examples, the recommendation to associate the images with the particular item may be sent to the merchant via a communication, such as via electronic mail, text, an application, (e.g., merchant application, social media application, etc.), a dashboard, a telephone call, etc. In the illustrative example, the service provider causes the images to surface on the user interface of the merchant computing device. In various examples, the recommendation may include a selectable option to accept or reject the respective merchant-facing and customer-facing images.

Block 610 illustrates, based at least in part on identifying images representative of the item ("Yes" at block 608), associating the merchant-facing image and the customer-facing image with the new item. In various examples, the service computing device may associate the merchant-facing image and the customer-facing image with the new item based on an acceptance associated therewith received from the merchant. In various examples, the service computing device may automatically associate the merchant-facing image and the customer-facing image with the new item based on a respective identification.

Block 612 illustrates causing the merchant-facing image to be presented via a display of the merchant computing device. The service computing device may send an instruction to a merchant application or other program on the merchant computing device to display the merchant-facing image as a representation of the new item.

Block 614 illustrates causing the customer-facing image to be presented via a display of a customer computing device. In some examples, the service computing device may cause the customer-facing image to be presented via a display of a merchant computing device. The merchant computing device may be a same or a different device used by the merchant to conduct a transaction. In some examples, the merchant computing device may include a screen configured for viewing by the customer. In such examples, the merchant computing device may present the customer-facing image on a display configured for viewing by the customer. In various examples, the service computing device may send an instruction to a merchant application or other program on the merchant computing device and/or customer computing device to display the customer-facing image as a representation of the new item. In some examples, the service computing device may cause the customer-facing image to display on a website associated with the merchant accessed by the customer for viewing the merchant inventory.

Figure 7:
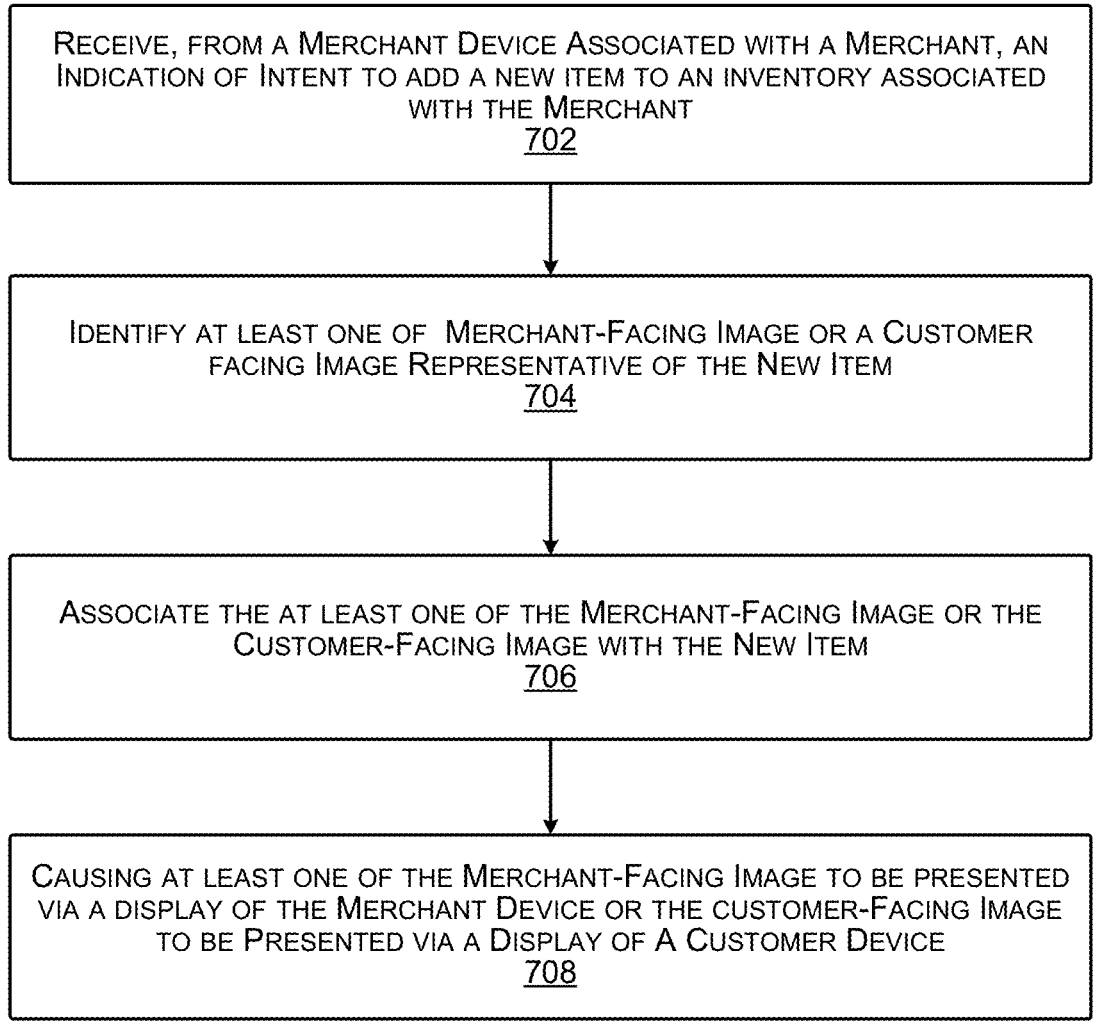
FIG. 7 is a flow diagram illustrating another example process for identifying an image representative of an item of inventory.

FIG. 7 is a flow diagram illustrating an example process 700 for identifying an image representative of an item of inventory. The example process 700 may be performed by a service computing device, such as service computing device 102, associated with a service provider. The process 700 may be performed by one or more components of the service computing device, as described below with regard to FIG. 10.

Block 702 illustrates receiving, from a merchant device associated with a merchant, an indication of intent to add a new item to an inventory associated with the merchant. The indication of intent may include an entry of details regarding the new item in a user interface of the merchant device, such as user interface 202. In some examples, the indication of intent may be received via a merchant application on the merchant device. In various examples, the indication of intent may include a request to add the new item to the inventory and/or a catalog associated with the merchant. The catalog may include a merchant inventory associated with a merchant and may represent the items of inventory offered for sale by the merchant.

Block 704 illustrates identifying at least one of a merchant-facing image or a customer-facing image representative of the new item. The merchant-facing image and the customer-facing image may be representative of the new item added to the catalog. The merchant-facing image may be an image used to represent the item on a user interface of a merchant computing device, for example, when the merchant is conducting a transaction. The customer-facing image may include an image used to represent the item to a customer on a user interface of a merchant computing device and/or a customer computing device. The customer-facing image may include an image that is more detailed, accurate, and/or aesthetically pleasing than the merchant-facing image.

In various examples, the service computing device may analyze one or more image databases to identify the at least one of the merchant-facing image or the customer-facing image. The image database(s) may include databases managed by the service computing device and/or by a third-party. In some examples the third-party may include a third-party service provider, such as a third-party that manages a website configured to display images stored in databases.

In various examples, the service computing device may analyze descriptors associated with the item and/or the images in the database(s) to identify the merchant-facing and customer facing images. In some examples, the service computing device may analyze metadata associated with the images in the database to identify the merchant-facing and customer facing images. In some examples, the service computing device may analyze images used by one or more similar merchants to represent the item. In such examples, the identification of the merchant-facing and customer facing images may be based at least in part on images used by similar merchants.

In various examples, the identification may be based at least in part on a verification of appropriate licensing of the at least one of a merchant-facing image or a customer-facing image. In such examples, the service computing device may be configured to determine that the at least one of a merchant-facing image or a customer-facing image are licensed for use by the merchant to represent the items of inventory. In some examples, an appropriate license may include the at least one of a merchant-facing image or a customer-facing image being licensed to the public domain (e.g., creative Commons zero license, or other public domain license). In some examples, an appropriate license may include the at least one of a merchant-facing image or a customer-facing image being licensed for use by other merchants, such as for use in merchant catalogs. In various examples, prior to storing the at least one of a merchant-facing image or a customer-facing image in an image database, the service computing device may request that the merchant providing the image sign a licensing agreement and/or license the at least one of a merchant-facing image or a customer-facing image to at least other merchants associated with the service computing device.

Block 706 illustrates associating the at least one of the merchant-facing image or the customer-facing image with the new item. In various examples, the service computing device may automatically associate the at least one of the merchant-facing image or the customer-facing image with the new item based on an identification thereof. In some examples, the service computing device may associate the at least one of the merchant-facing image or the customer-facing image with the new item based on a verification of an appropriate license associated with the at least one of a merchant-facing image or a customer-facing image. In various examples, the service computing device may send a recommendation to the merchant computing device to associate the at least one of the merchant-facing image or the customer-facing image with the new image.

In various examples, the recommendation to associate the at least one of the merchant-facing image or the customer-facing image with the new item may be sent to the merchant via a communication, such as via electronic mail, text, an application, (e.g., merchant application, social media application, etc.), a dashboard, a telephone call, etc. In some examples, the service provider may cause the recommendation to surface on a user interface of the merchant computing device.

Block 708 illustrates causing at least one of the merchant-facing image to be presented via a display of the merchant device or the customer-facing image to be presented via a display of a customer device. In various examples, the service computing device may send an instruction to a merchant application or other program on the merchant computing device and/or customer computing device to display the at least one of the merchant-facing image or the customer-facing image as a representation of the new item. In some examples, the service computing device may cause the customer-facing image to display on a website associated with the merchant accessed by the customer for viewing the merchant inventory.

Figure 8:
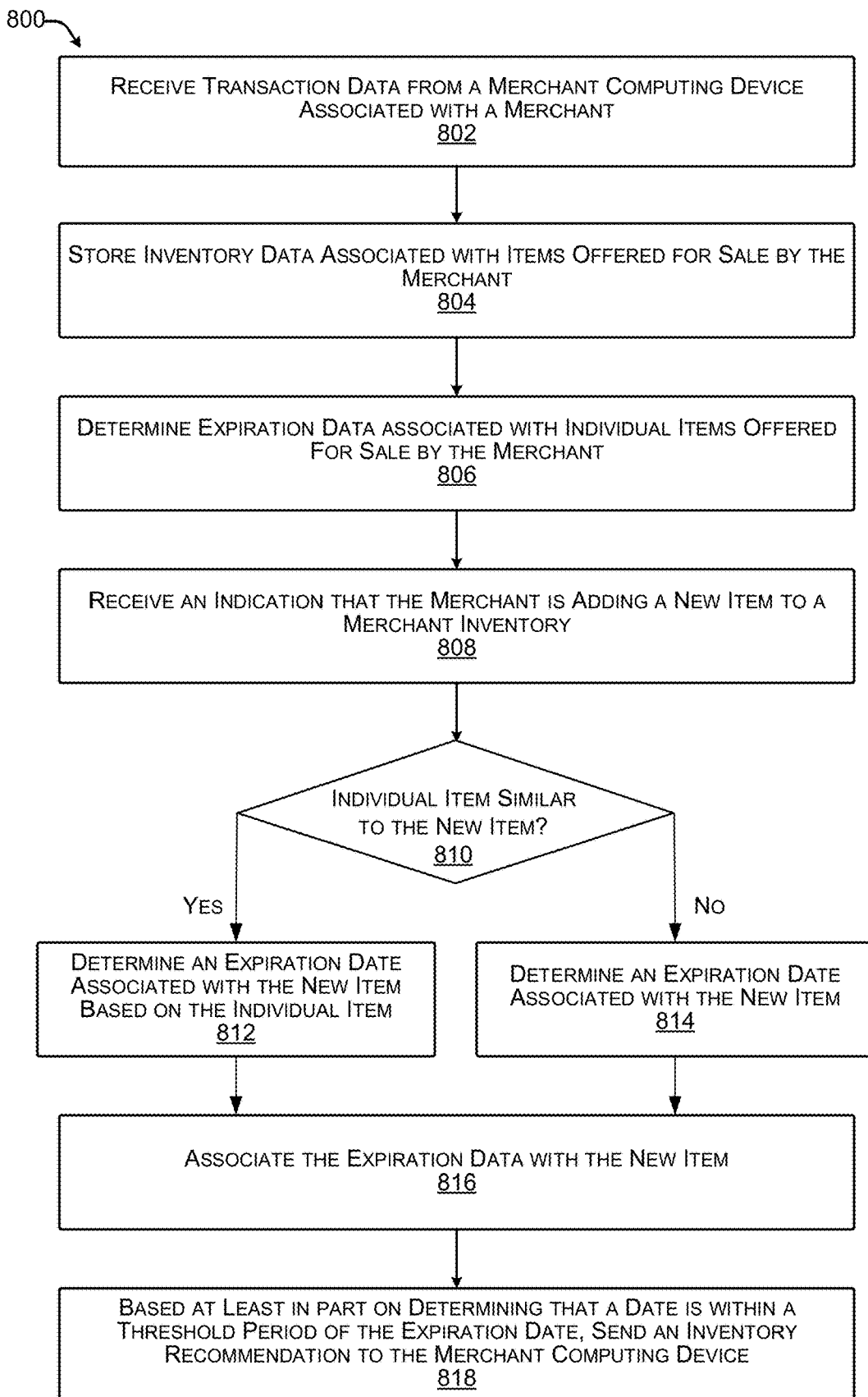
FIG. 8 is a flow diagram illustrating an example process for determining an inventory recommendation for a merchant.

FIG. 8 is a flow diagram illustrating an example process 800 for determining an inventory recommendation for a merchant. The example process 800 may be performed by a service computing device, such as service computing device 102, associated with a service provider. The process 800 may be performed by one or more components of the service computing device, as described below with regard to FIG. 10.

Block 802 illustrates receiving transaction data from a merchant computing device associated with a merchant. The transaction data may include data representative of one or more transactions between the merchant and one or more customers. The transaction data may include items sold in the transaction, quantities of each item, a price associated with each item, discounts applied, payment methods used by the customer (e.g., credit card, debit card, gift card, cash, etc.). In various examples, the service computing device may be configured to derive sales data (e.g., frequency of sales, amount per sale, average sale value, most frequent product sold, etc.) from the transaction data.

Block 804 illustrates storing inventory data associated with items offered for sale by the merchant. In various examples, the service provider may determine inventory data based on transaction data received from the merchant device. In some examples, the service provider may derive the inventory data from the transaction data. For example, the service provider may determine a number of items remaining in a merchant inventory based on a number of items in the inventory prior to the transaction and a number of items sold during the transaction. In various examples, the service computing device may receive inventory data from the merchant computing device separate from the transaction data, such as while adding items of inventory to a merchant catalog.

Block 806 illustrates determining expiration data associated with individual items offered for sale by the merchant. The expiration data may include an expiration date and/or time, sell-by date, use-by date, best if used by date, or the like associated with the individual items. The expiration data may be set by the manufacturer, supplier, service provider, and/or the merchant.

Block 808 illustrates receiving an indication that the merchant is adding a new item to a merchant inventory. In various examples, the indication may be based at least in part on the service computing device receiving inventory data associated with the new item. In various examples, the inventory data may be received via an inventory entry, such as that illustrated and described with respect FIG. 2. In some examples, the inventory data may be received in an update to a merchant inventory, or other means for the merchant to indicate the addition of a new item to the merchant inventory.

Block 810 illustrates determining whether an individual item is similar to the new item. In various examples, the service computing device may determine that the individual item is similar to the new item based at least in part on similarities of inventory data associated therewith. The items may be determined to be similar based on the items sharing a predetermined number of descriptors, sharing particular descriptors (e.g., product code, name, etc.), merchant identification of same or similar items, other merchants associated with the service provider identifying the items as the same or similar, or the like. In various examples, one or more data models of the service computing device may analyze the items and determine a level of similarity between the two. Based at least in part on the level of similarity being within a threshold level of similarity, the data model(s) may determine that the items are the same or similar.

In various examples, the similarity may be based on a determination by a similar merchant that the individual item and the new item are similar. In such examples, the similar merchant may provide the determination to the service computing device, for association between the two items as similar items. In some examples, the service computing device may associate, as similar items, the individual item and the new item based on a threshold number of similar merchants providing the determination that the items are similar.

Based on a determination that the new item is similar to an individual item ("Yes" at block 810), at block 812, the service computing device may determine an expiration date associated with the new item based on expiration data associated with the individual item. In various examples, the expiration date may additionally include an expiration time (e.g., 3 p.m., 5 p.m., etc.).

Based on a determination that the new item is not similar to an individual item ("No" at block 810), at block 814, the service computing device may determine an expiration date associated with the new item, such as based on inventory data associated with the new item, a merchant input with regard to the expiration date, a merchant preference, or the like.

Block 816 illustrates associating the expiration date, determined at block 812 or 814, with the new item. In various examples, the service computing device may store the expiration date in a database, such as in the inventory data.

Block 818 illustrates, based at least in part on determining that a date is within a threshold period of time of the expiration date, sending a recommendation to the merchant computing device. In various examples, the service computing device may send the recommendation via a communication, such as via electronic mail, text, an application, (e.g., merchant application, social media application, etc.), a dashboard, a telephone call, and/or other means by providing a recommendation to a merchant. In various examples, the service computing device may cause the recommendation to surface on a display of the merchant computing device, such as via a merchant application.

In various examples, the recommendation may include one or more action(s) for the merchant to perform to encourage a sale of a particular item that is due to expire within the threshold period of time. The action(s) may include offering the item(s) for sale at a discount, changing a location associated with the item(s) in a merchant location (e.g., store), adjusting a location associated with the item on a listing of merchant offerings (e.g., digital listing, menu, etc.), changing a display associated with the item(s), combining the item(s) with other items offered for sale, offering a promotion with the sale of the item(s) (e.g., buy one get one free, additional free item with purchase, etc.).

In various examples, the service computing device may determine the action(s) based on actions previously performed by similar merchant(s). In some examples, the action(s) may be based on successful actions previously performed by similar merchant(s), such as those that resulted in a high percentage of sales. In some examples, the service computing device may be configured to monitor inventory and/or transaction data associated with similar merchants and sales data associated with the soon-to-be expired items. In various examples, the service computing device may determine, based at least in part on sales corresponding to actions, the success of a particular action corresponding to a particular item. In some examples, the success may be based on a threshold percentage (e.g., 25%, 50%, 75%, etc.) of a soon-to-be expired item being sold. In some examples, the service computing device may rank actions associated with the particular item of inventory for similar merchant(s) based on sales data associated therewith. In such examples, the recommended action(s) may be based in part on the ranking. For example, a first action may result in four of the five soon-to-be expired items being sold while a second action may result in seven of the ten soon-to-be expired items being sold. Based on the sales data, the first action may be ranked higher than the second action.

In various examples, a data model(s) of the service computing device may be trained by the training module to determine the action(s) to recommend to the merchant. In some examples, the training module may train the data model(s) with training data including actions performed by similar merchants responsive to expiration dates. In such examples, the data model(s) may be configured to output one or more actions determined to be successful based on the similar merchant(s).

In various examples, the recommendation may include a recommendation to add a second new item (e.g., an additional item) of inventory. In various examples, the recommendation to add the additional item may be based, at least in part, on the addition of the new item to the merchant inventory. In various examples, the recommendation may be based on transaction data and/or inventory data associated with similar merchants. For example, the similar merchants may often sell the additional item with the new item and/or with other items in the merchant inventory. In some examples, the additional item may include an item that is complementary to, often sold concurrently with, and/or pairs well with the new item and/or another item in the merchant inventory.

In some examples, based at least in part on receiving an acceptance to add the additional item of inventory, the service provider may place an order for the additional item on behalf of the merchant, for shipment to a merchant location associated with the merchant. In various examples, based in part on receiving the acceptance, the service provider may automatically determine a quantity of the additional item (e.g., 5, 10, 20, 30, etc.) to order for the merchant and/or automatically order the additional item(s) for the merchant.

In some examples, the service provider may receive a request from the merchant to order the additional item, such as, from a supplier. In some examples, the request may include a quantity of the additional item to order. Based at least in part on the service provider ordering the additional item for the merchant, the service provider may update the merchant inventory with inventory data associated with the additional item. In some examples, the merchant may receive the recommendation to order the additional item and may order the additional item from a supplier. In such examples, the merchant may send the service provider an inventory data update including details about the additional item (e.g., inventory data associated with the additional item).

Figure 9:
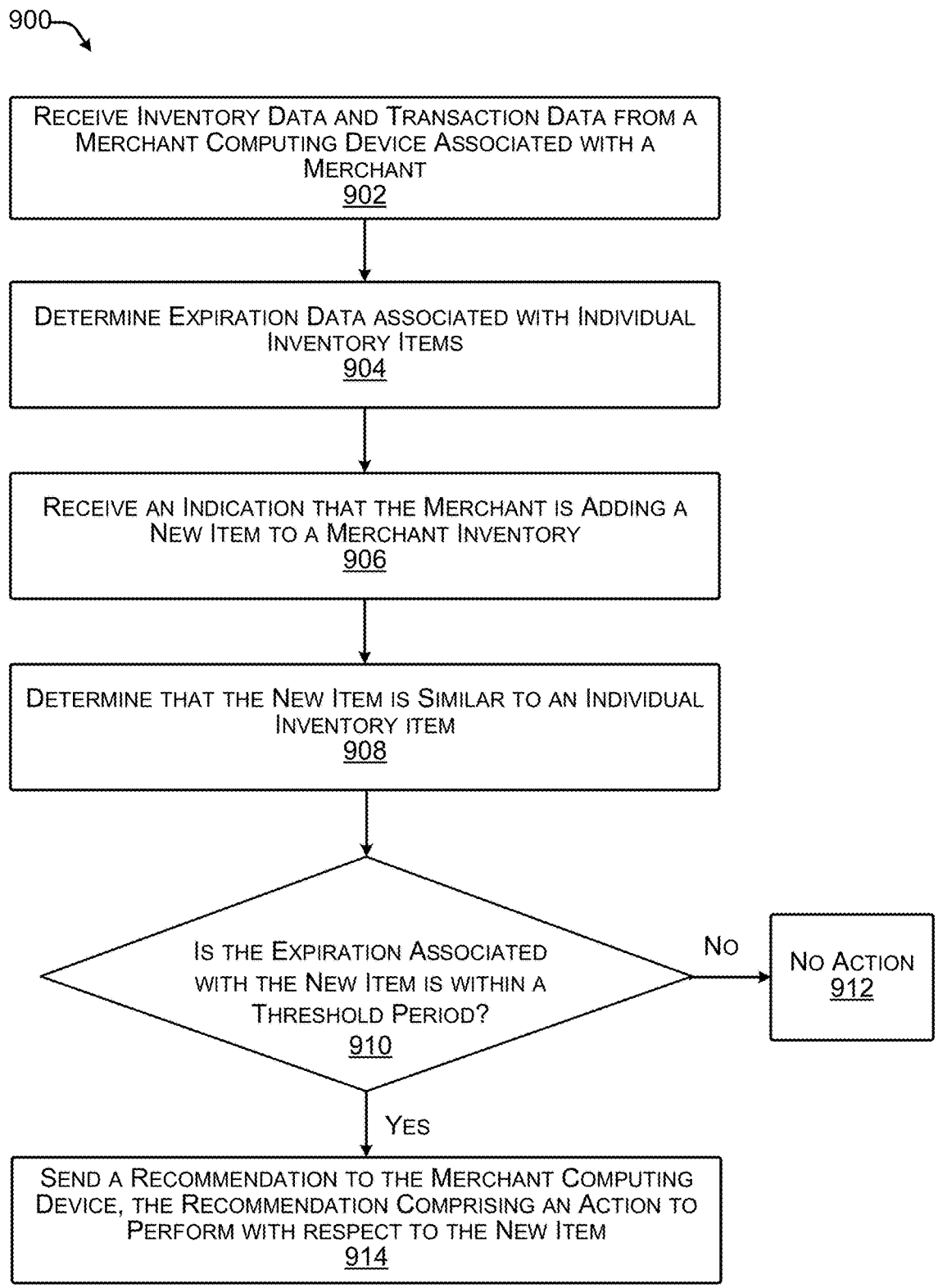
FIG. 9 is a flow diagram illustrating another example process for determining an inventory recommendation for a merchant.

FIG. 9 is a flow diagram illustrating another example process 900 for determining an inventory recommendation for a merchant. The example process 900 may be performed by a service computing device, such as service computing device 102, associated with a service provider. The process 900 may be performed by one or more components of the service computing device, as described below with regard to FIG. 10.

Block 902 illustrates receiving inventory data and transaction data from a merchant computing device associated with a merchant. The inventory data may include an inventory type, a code (e.g., universal product code (UPC), etc.), color(s), manufacturer(s), make, model, and/or style associated with an item of inventory, a quantity of a particular item in inventory, turnover rate, sales velocity, profit margins, or the like. The transaction data may include items sold in the transaction, quantities of each item, a price associated with each item, discounts applied, payment methods used by the customer (e.g., credit card, debit card, gift card, cash, etc.).

Block 904 illustrates determining expiration data associated with individual inventory items of a merchant inventory. The expiration data may include an expiration date and/or time, sell-by date, use-by date, best if used by date, or the like associated with the individual items. The expiration data may be set by the manufacturer, supplier, service provider, and/or the merchant.

Block 906 illustrates receiving an indication that the merchant is adding a new item to the inventory items. In various examples, the indication may be based at least in part on the service computing device receiving inventory data associated with the new item. In various examples, the inventory data may be received via an inventory entry, such as that illustrated and described with respect FIG. 2. In some examples, the inventory data may be received in an update to a merchant inventory, or other means for the merchant to indicate the addition of a new item to the merchant inventory.

Block 908 illustrates determining that the new item is similar to an individual inventory item of the inventory items. In various examples, the service computing device may determine that the individual item is similar to the new item based at least in part on similarities of inventory data associated therewith. The items may be determined to be similar based on the items sharing a predetermined number of descriptors, sharing particular descriptors (e.g., product code, name, etc.), merchant identification of same or similar items, other merchants associated with the service provider identifying the items as the same or similar, or the like. In various examples, one or more data models of the service computing device may analyze the items and determine a level of similarity between the two. Based at least in part on the level of similarity being within a threshold level of similarity, the data model(s) may determine that the items are the same or similar.

In various examples, the similarity may be based on a determination by a similar merchant that the individual item and the new item are similar. In such examples, the similar merchant may provide the determination to the service computing device, for association between the two items as similar items. In some examples, the service computing device may associate, as similar items, the individual item and the new item based on a threshold number of similar merchants providing the determination that the items are similar.

Block 910 illustrates determining whether an expiration associated with the new item is within a threshold period of time. The threshold period of time may be determined by the service provider based on an expiration date setting associated with the service provider, a manufacturer recommendation, and/or a merchant preference.

In various examples, the expiration date may additionally include an expiration time (e.g., 3 p.m., 5 p.m., etc.). The expiration date may be based on expiration data associated with the individual item. In various examples, the expiration date may be determined based on inventory data associated with the new item, a merchant input with regard to the expiration date, a merchant preference, or the like.

Based on a determination that the expiration associated with the item is not within a threshold period of time, at block 912, the service computing device determines to take no action with regard to the new item.

Based on a determination that the expiration associated with the new item is within a threshold period of time, at block 914, the service computing device may send a recommendation to the merchant computing device comprising an action to perform with respect to the new item. In some examples, the service computing device may cause the recommendation to surface on a display associated with the merchant computing device. In some examples, the service computing device may send the recommendation in a communication, such as via electronic mail, text, an application, (e.g., merchant application, social media application, etc.), a dashboard, a telephone call, or the like.

As discussed above, the recommendation may include one or more action(s) for the merchant to perform to encourage a sale of the new item that is due to expire within the threshold period of time. Additionally or alternatively, the recommendation may include a recommendation to add a second new item (e.g., an additional item) of inventory. In some examples, the additional item may be an item that pairs well or often sells concurrently with the new item.

Figure 10:
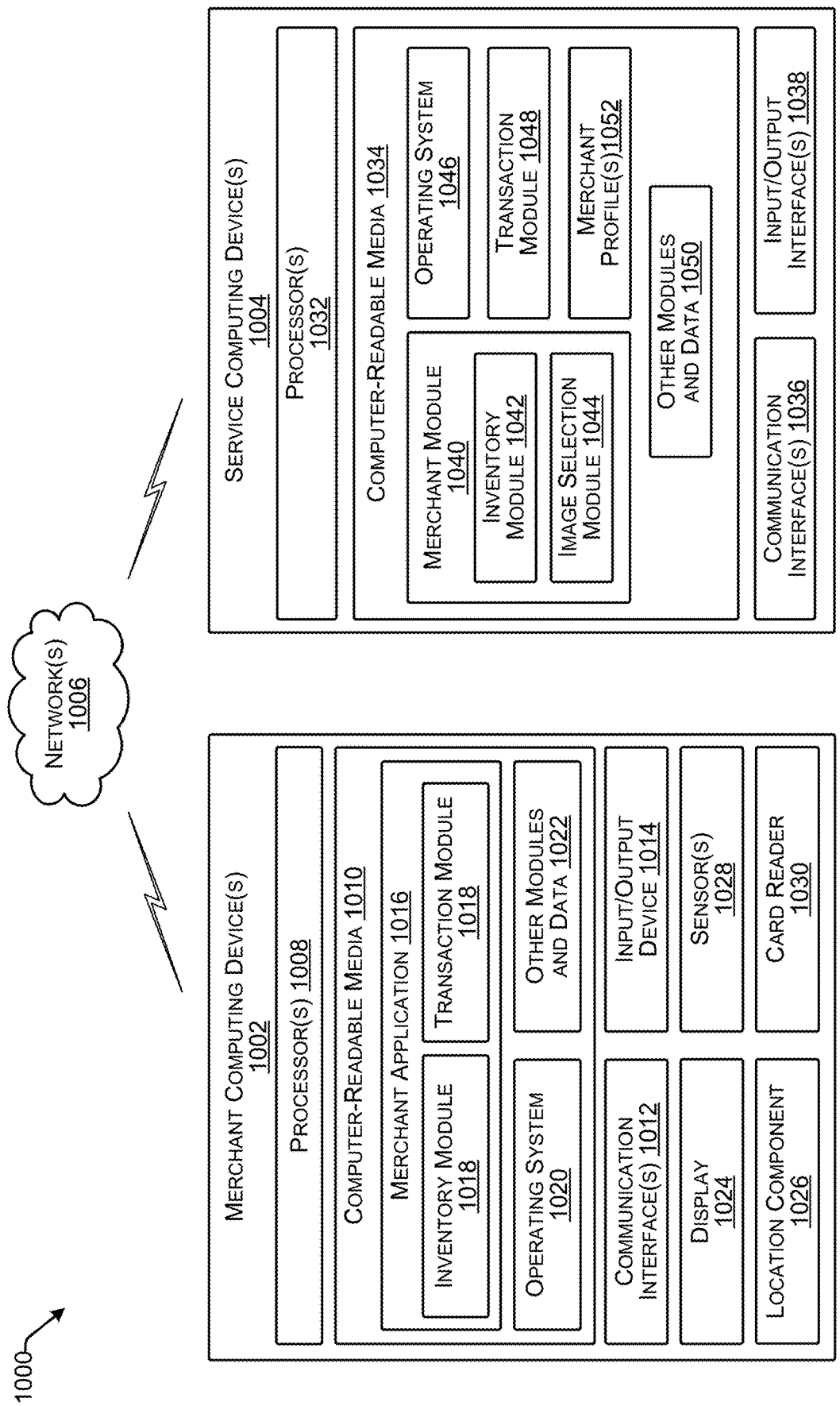
FIG. 10 depicts an illustrative block diagram illustrating a system for performing techniques as described herein.

FIG. 10 depicts an illustrative block diagram illustrating a system 1000 for performing techniques as described herein. The system 1000 includes a merchant device 1002, such as merchant device 110, that communicates with server computing device(s) 1004, such as server computing device(s) 102, via network(s) 1006 (e.g., the Internet, cable network(s), cellular network(s), wireless network(s) (e.g., Wi-Fi) and wired network(s), as well as close-range communications such as Bluetooth®, Bluetooth® low energy, and the like). While a single merchant device 1002 is illustrated, in additional or alternate examples, the system 1000 may have multiple merchant devices.

In at least one example, the merchant device 1002 may be any suitable type of computing device, e.g., portable, semi-portable, semi-stationary, or stationary. Some examples of the merchant device 1002 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 1002 includes one or more processors 1008, one or more computer-readable media 1010, one or more communication interfaces 1012, and one or more input/output (I/O) devices 1014. Each processor 1008 may itself comprise one or more processors or processing cores. For example, the processor(s) 1008 can be implemented as one or more microprocessors, microcomputers, microcontrollers, digital signal processors, central processing units, state machines, logic circuitries, and/or any devices that manipulate signals based on operational instructions. In some examples, the processor(s) 1008 may be one or more hardware processors and/or logic circuits of any suitable type specifically programmed or configured to execute the algorithms and processes described herein. The processor(s) 1008 may be configured to fetch and execute computer-readable processor-executable instructions stored in the computer-readable media 1010.

Depending on the configuration of the merchant device 1002, the computer-readable media 1010 may be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1010 may include, but is not limited to, RAM, ROM, EEPROM, flash memory, solid-state storage, magnetic disk storage, optical storage, and/or other computer-readable media technology. Further, in some examples, the merchant device 1002 may access external storage, such as RAID storage systems, storage arrays, network attached storage, storage area networks, cloud storage, or any other medium that can be used to store information and that can be accessed by the processor(s) 1008 directly or through another computing device or network. Accordingly, the computer-readable media 1010 may be computer storage media able to store instructions, modules or components that can be executed by the processor(s) 1008. Further, when mentioned, non-transitory computer-readable media exclude media such as energy, carrier signals, electromagnetic waves, and signals per se.

The computer-readable media 1010 may be used to store and maintain any number of functional components that are executable by the processor(s) 1008. In some implementations, these functional components comprise instructions or programs that are executable by the processor(s) 1008 and that, when executed, implement operational logic for performing the actions and services attributed above to the merchant device 1002. Functional components stored in the computer-readable media 1010 may include the merchant application 1016, which may include an inventory module 1020 and a transaction module 1020, at least some of the functionalities of which are described above. In other examples, the inventory module 1018 and/or the transaction module 1020 may be stored in the computer-readable media 1010 independently or associated with another application. Further, in some examples, the inventory module 1018 and/or the transaction module 1020 may be accessible via a web browser, etc.

Furthermore, the computer-readable media 1010 may include additional functional components, such as an operating system 1020 for controlling and managing various functions of the merchant device 1002 and for enabling basic user interactions. In addition, the computer-readable media 1010 may also store data, data structures and the like, that are used by the functional components. Depending on the type of the merchant device 1002, the computer-readable media 1002 may also optionally include other functional components and data, such as other modules and data 1022, which can include programs, drivers, etc., and the data used or generated by the functional components. Further, the merchant device 1002 may include many other logical, programmatic and physical components, of which those described are merely examples that are related to the discussion herein.

The communication interface(s) 1012 may include one or more interfaces and hardware components for enabling communication with various other devices, such as over the network(s) 1006 or directly. For example, communication interface(s) 1012 may enable communication through one or more network(s) 1006, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1006 may include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The merchant device 1002 may further include the one or more I/O devices 1014. The I/O devices 1014 may include speakers, a microphone, a camera, and various user controls (e.g., buttons, a joystick, a keyboard, a keypad, etc.), a haptic output device, and so forth.

In at least one example, merchant device 1002 may include a display 1024. Depending on the type of computing device(s) used as the merchant device 1002, the display 1024 may employ any suitable display technology. For example, the display 1024 may be a liquid crystal display, a plasma display, a light emitting diode display, an OLED (organic light-emitting diode) display, an electronic paper display, or any other suitable type of display able to present digital content thereon. In some examples, the display 1024 may have a touch sensor associated with the display 1024 to provide a touchscreen display configured to receive touch inputs for enabling interaction with a graphic interface presented on the display 1024. Accordingly, implementations herein are not limited to any particular display technology. Alternatively, in some examples, the merchant device 1002 may not include the display 1024, and information can be presented by other means, such as aurally.

The merchant device 1002 may include a location component 1026. The location component 1026 may include a GPS subsystem including a device to provide location information. In some examples, the location component 1026 may include a non-GPS based location-based sensor. In addition, the merchant device 1002 may include sensor(s) 1028. The sensor(s) 1028 may include, but are not limited to, an accelerometer, gyroscope, compass, proximity sensor, camera, microphone, and/or a switch.

In addition, in some examples, the merchant device 1002 may include or can be connectable to a card reader 1030 for reading payment instruments and/or identifiers associated with payment objects. In some examples, the card reader 1030 may plug in to a port in the merchant device 1002, such as via a microphone/headphone port, a data port, or other suitable port. The card reader 1030 may include a read head for reading a magnetic strip of a payment card, and further can include encryption technology for encrypting the information read from the magnetic strip. Additionally or alternatively, the card reader 1030 can be an EMV payment reader, which in some examples, can be embedded in the merchant device 1002. Moreover, numerous other types of readers can be employed with the merchant device 1002 herein, depending on the type and configuration of the merchant device 1002.

Additionally, the merchant device 1002 may include various other components that are not shown, examples of which include removable storage, a power source, such as a battery and power control unit, a barcode scanner, a printer, a cash drawer, and so forth.

The server computing device(s) 1004 may include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server computing device(s) 1004 as being present in a single location, these components and data can alternatively be distributed across different computing devices and different locations in any manner. Consequently, the functions can be implemented by one or more server computing devices 1004, with the various functionality described above distributed in various ways across the different computing devices. Multiple server computing device(s) 1004 can be located together or separately, and organized, for example, as virtual servers, server banks and/or server farms. The described functionality can be provided by the servers of a single merchant or enterprise or can be provided by the servers and/or services of multiple different customers or enterprises.

In the illustrated example, the server computing device(s) 1004 may include one or more processors 1032, one or more computer-readable media 1034, one or more communication interfaces 1036, and one or more input/output devices 1038. Each processor 1032 may be a single processing unit or a number of processing units and may include single or multiple computing units or multiple processing cores. The processor(s) 1032 may be implemented as one or more microprocessors, microcomputers, microcontrollers, digital signal processors, central processing units, state machines, logic circuitries, and/or any devices that manipulate signals based on operational instructions. For example, the processor(s) 1032 may be one or more hardware processors and/or logic circuits of any suitable type specifically programmed or configured to execute the algorithms and processes described herein. The processor(s) 1032 may be configured to fetch and execute computer-readable instructions stored in the computer-readable media 1034, which can program the processor(s) 1032 to perform the functions described herein.

The computer-readable media 1034 may include volatile and nonvolatile memory and/or removable and non-removable media implemented in any type of technology for storage of information, such as computer-readable instructions, data structures, program modules, or other data. Such computer-readable media 1034 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server computing device(s) 1004, the computer-readable media 1034 may be a type of computer-readable storage media and/or can be a tangible non-transitory media to the extent that when mentioned, non-transitory computer-readable media exclude media such as energy, carrier signals, electromagnetic waves, and signals per se.

The computer-readable media 1034 may be used to store any number of functional components that are executable by the processor(s) 1032. In many implementations, these functional components comprise instructions or programs that are executable by the processor(s) 1032 and that, when executed, specifically configure the one or more processors 1032 to perform the actions attributed above to the service provider and/or payment processing service. Functional components stored in the computer-readable media 1034 may include a merchant module 1040, an inventory module 1042, such as inventory module 120, and an image selection module 1044, such as image selection module 118. At least some of the functionality associated with the merchant module 1040, the inventory module 1042, and the image selection module 1044 is described above with reference to FIGS. 1-9. Additional functional components stored in the computer-readable media 1034 may include an operating system 1046 for controlling and managing various functions of the server computing device(s) 1004 and a transaction module 1048 for assisting merchants in processing transactions, as described above.

In at least one example, the computer-readable media 1034 may include or maintain other functional components and data, such as other modules and data 1050, which can include programs, drivers, etc., and the data used or generated by the functional components. Further, the server computing device(s) 1004 may include many other logical, programmatic and physical components, of which those described above are merely examples that are related to the discussion herein.

In at least one example, the computer-readable media 1034 may store one or more merchant profiles 1052 corresponding to merchants that are associated with services provided by the payment processing service. As described above, the merchant profiles 1052 may include merchant data including, but not limited to, a merchant category classification (MCC), item(s) offered for sale by the merchant, transaction data associated with transactions conducted by the merchant, hardware (e.g., device type) used by the merchant, previous loans made to the merchant, previous defaults on said loans, an indication of risk (e.g., based at least in part on fraud, chargeback, etc.) associated with the merchant, etc. The merchant profile(s) 1052 may securely store bank account information as provided by the merchant.

The communication interface(s) 1036 may include one or more interfaces and hardware components for enabling communication with various other devices, such as over the network(s) 1006. For example, communication interface(s) 1036 may enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The server computing device(s) 1004 may further be equipped with various input/output (I/O) devices 1038. Such I/O devices 1038 may include a display, various user interface controls (e.g., buttons, joystick, keyboard, mouse, touch screen, etc.), audio speakers, connection ports and so forth.

While the aforementioned disclosure makes reference to user interactions via a UI presented via a display of a device, the UI can be presented via any input/output device. As an example, the UI can be output via a speaker, and augmented reality projector, etc. Further, while the aforementioned disclosure makes reference to the merchant interacting with the UI via a selectable control, in additional or alternative examples, the merchant can indicate a selection via a spoken input or other type of input.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method, performed in part by a server computing system of a payment processing service, comprising:
   receiving, by the server computing system, transaction data associated with transactions processed by the payment processing service on behalf of merchants, the transaction data received via respective instances of a point-of-sale (POS) application configuring merchant computing devices as POS terminals for generating and transmitting at least the transaction data to the server computing system via a network;
   storing, by the server computing system, inventory data associated with items offered for sale by the merchants;
   determining, based at least in part on the transaction data and the inventory data, expiration data associated with individual items offered for sale by the merchants;
   receiving, by the server computing system and from a merchant computing device associated with a merchant of the merchants, an indication that the merchant is adding a new item to a merchant inventory;
   determining, by the server computing system and based on the inventory data of the merchants, an individual item that is similar to the new item;
   determining, by the server computing system and based on expiration data of the determined individual item, an expiration date associated with the new item;
   associating, by the server computing system, the expiration date with the new item in the merchant inventory of the merchant; and
   based at least in part on determining that a date is within a threshold period of time of the expiration date, sending, by the server computing system and to the merchant computing device, a recommendation comprising at least one of:
      an adjustment to a location of the new item within a merchant location or on a listing of merchant offerings to emphasize the new item;
      a use of the new item to encourage a sale or consumption thereof;
      an offer to sell the new item at a discount; or
      another item with which to bundle the new item to expedite a sale of the new item.

2. The method as claim 1 recites, further comprising:
   causing a merchant application on the merchant computing device to adjust an icon associated with the new item on a display to emphasize the new item, wherein and adjustment to the icon comprises at least one of a change in:
   size of the icon;
   shape of the icon;
   color associated with the icon; or
   a position of the icon on the display.

3. The method as claim 1 recites, further comprising:
   analyzing descriptors associated with the individual item and the new item; and
   determining that the individual item and the new item share at least one of:
      a pre-determined number of descriptors; or
      a set of descriptors,
   wherein determining that the individual item is similar to the new item is based at least in part on the individual item and the new item sharing the at least one of the pre-determined number of descriptors or the set of descriptors.

4. The method as claim 1 recites, further comprising:
   determining that the merchant has performed the action;
   receiving, from the merchant computing device, subsequent transaction data corresponding to transactions conducted after the merchant performed the action;
   determining, based at least in part on the subsequent transaction data, sales data corresponding to the new item; and
   based at least in part on the sales data, determining a level of success associated with the action.

5. A system comprising:
   one or more processors; and
   one or more computer-readable media storing instructions executable by the one or more processors, wherein the instructions program the one or more processors to:

receive, by the one or more processors and from a merchant computing device, inventory data corresponding to inventory associated with a merchant and transaction data associated with transactions conducted between the merchant and customers, wherein the transaction data is received via an instance of a point-of-sale (POS) application configuring the merchant computing device as a POS terminal for generating and transmitting at least the transaction data via a network;

determine, by the one or more processors and based at least in part on the transaction data and the inventory data, expiration data associated with an item of the inventory;

receive, by the one or more processors, an indication that the merchant is adding a new item to the inventory;

determine, by the one or more processors, that the new item is similar to the item;

determine, by the one or more processors and based at least in part on a similarity between the new item and the item, that an expiration timing associated with the new item is within a threshold period of time; and cause, by the one or more processors, a recommendation to surface on a display of the merchant computing device, the recommendation comprising an action associated with the new item.

6. The system as claim 5 recites, wherein the action comprises at least one of:

an adjustment to a location of the new item within a merchant location or on a listing of merchant offerings to emphasize the new item;

a use of the new item to encourage a sale or consumption thereof;

an offer to sell the new item at a discount; or an offer to sell the new item with another item.

7. The system as claim 5 recites, wherein the instructions program the one or more processors to:

based at least in part on determining that the expiration timing associated with the new item is within a threshold period of time, modify a size, placement, or a shape of an icon associated with the new item on a user interface of the merchant computing device.

8. The system as claim 5 recites, wherein the instructions program the one or more processors to:

receive, from the merchant computing device, a merchant preference associated with expirations corresponding to items of the inventory, wherein the expiration data associated with the item is determined based at least in part on the merchant preference.

9. The system as claim 5 recites, wherein the instructions program the one or more processors to:

analyze descriptors associated with the item and the new item; and determine that the item and the new item share at least one of:

a number of descriptors; or a set of descriptors, wherein determining that the new item is similar to the item is based at least in part on the item and the new item sharing the at least one of the number of descriptors or the set of descriptors.

10. The system as claim 5 recites, wherein determining that the new item is similar to the item is based, at least in part, on a similarity score calculated utilizing machine learning techniques.

11. The system as claim 5 recites, wherein the instructions program the one or more processors to:

determine that the merchant has performed the action;

receive subsequent transaction data corresponding to transactions between the merchant and customers in which the new item was purchased;

determine, based at least in part on the subsequent transaction data, sales data corresponding to the new item; and based at least in part on the sales data, determine a level of success associated with the action.

12. The system as claim 5 recites, wherein the action is determined using machine learning techniques based at least in part on one or more actions previously recommended to one or more similar merchants, the one or more actions being associated with a same or similar item to the new item.

13. A non-transitory computer-readable medium storing instructions executable by one or more processors, wherein the instructions program the one or more processors to:

receive, by the one or more processors and from a merchant computing device via a network, inventory data corresponding to inventory associated with a merchant and transaction data associated with transactions conducted between the merchant and customers, wherein the transaction data is received via an instance of an application stored on the merchant computing device;

determine, by the one or more processors and based at least in part on the transaction data and the inventory data, expiration data associated with an item of the inventory;

receive, by the one or more processors, an indication that the merchant is adding a new item to the inventory;

determine, by the one or more processors, that the new item is similar to the item;

determine, by the one or more processors and based at least in part on a similarity between the new item and the item, that an expiration timing associated with the new item is within a threshold period of time; and cause, by the one or more processors, a recommendation to surface on a display of the merchant computing device, the recommendation comprising an action associated with the new item.

14. The non-transitory computer-readable medium as claim 13 recites, wherein the action comprises at least one of:

an adjustment to a location of the new item within a merchant location or on a listing of merchant offerings to emphasize the new item;

a use of the new item to encourage a sale or consumption thereof;

an offer to sell the new item at a discount; or an offer to sell the new item with another item.

15. The non-transitory computer-readable medium as claim 13 recites, wherein the instructions program the one or more processors to:

based at least in part on determining that the expiration timing associated with the new item is within a threshold period of time, modify a size, placement, or a shape of an icon associated with the new item on a user interface of the merchant computing device.

16. The non-transitory computer-readable medium as claim 13 recites, wherein the instructions program the one or more processors to:

receive, from the merchant computing device, a merchant preference associated with expirations corresponding to the inventory, wherein the expiration data associated with the item is determined based at least in part on the merchant preference.

17. The non-transitory computer-readable medium as claim 13 recites, wherein determining that the new item is similar to the item is based, at least in part, on a similarity score calculated utilizing machine learning techniques.

18. The non-transitory computer-readable medium as claim 13 recites, wherein the instructions program the one or more processors to:
   analyze descriptors associated with the item and the new item; and
   determine that the item and the new item share at least one of:
   a number of descriptors; or
   a set of descriptors,
   wherein determining that the new item is similar to the item is based at least in part on the item and the new item sharing the at least one of the number of descriptors or the set of descriptors.

19. The non-transitory computer-readable medium as claim 13 recites, wherein the instructions program the one or more processors to:
   determine that the merchant has performed the action;
   receive subsequent transaction data corresponding to transactions between the merchant and a customer in which the new item was purchased;
   determine, based at least in part on the subsequent transaction data, sales data corresponding to the new item; and
   based at least in part on the sales data, determine a level of success associated with the action.

20. The non-transitory computer-readable medium as claim 19 recites, wherein the level of success associated with the action is used to update a data model utilizing machine learning techniques.

* * * * *